(12) United States Patent
Wu et al.

(10) Patent No.: US 7,398,478 B2
(45) Date of Patent: Jul. 8, 2008

(54) CONTROLLED NON-PROPORTIONAL SCALING DISPLAY

(75) Inventors: Peter Wu, Cupertino, CA (US); David Hendler Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 10/713,288

(22) Filed: Nov. 14, 2003

(65) Prior Publication Data

US 2005/0108656 A1    May 19, 2005

(51) Int. Cl.
*G06F 3/048* (2006.01)
*G06G 5/00* (2006.01)
*G06F 13/00* (2006.01)

(52) U.S. Cl. .................. 715/800; 345/645; 345/648; 345/666; 725/43

(58) Field of Classification Search .................. 715/800, 715/788, 508; 725/43; 348/569, 568; 345/660–671, 345/680, 648
See application file for complete search history.

(56) References Cited

U.S. PATENT DOCUMENTS

| | | | | |
|---|---|---|---|---|
| 5,384,904 A * | 1/1995 | Sprague et al. | ............. | 345/668 |
| 5,734,853 A * | 3/1998 | Hendricks et al. | ........... | 715/716 |
| 5,751,283 A * | 5/1998 | Smith | ........................ | 715/798 |
| 5,754,873 A * | 5/1998 | Nolan | ........................ | 715/527 |
| 5,760,772 A * | 6/1998 | Austin | ........................ | 715/798 |
| 6,064,376 A * | 5/2000 | Berezowski et al. | .......... | 725/42 |
| 6,236,407 B1 * | 5/2001 | Leban et al. | ................ | 345/630 |
| 6,370,281 B1 * | 4/2002 | Tanaka | ........................ | 382/298 |
| 6,414,698 B1 * | 7/2002 | Lovell et al. | ................ | 715/800 |
| 6,456,305 B1 * | 9/2002 | Qureshi et al. | .............. | 715/800 |
| 6,473,093 B1 * | 10/2002 | Halstead et al. | ............ | 345/619 |
| 6,473,102 B1 * | 10/2002 | Rodden et al. | .............. | 715/788 |
| 6,577,350 B1 * | 6/2003 | Proehl et al. | ................ | 348/564 |
| 6,608,631 B1 * | 8/2003 | Milliron | ..................... | 345/647 |
| 6,636,235 B1 * | 10/2003 | Cooper et al. | .............. | 345/660 |
| 6,674,439 B1 * | 1/2004 | Shin et al. | ................... | 345/501 |
| 6,750,887 B1 * | 6/2004 | Kellerman et al. | ......... | 715/788 |
| 6,879,331 B2 * | 4/2005 | Cragun | ...................... | 345/661 |
| 6,950,993 B2 * | 9/2005 | Breinberg | ................... | 715/801 |
| 6,954,897 B1 * | 10/2005 | Noguchi et al. | ............ | 715/542 |
| 7,061,545 B1 * | 6/2006 | Kweon et al. | ............... | 348/569 |
| 7,216,293 B2 * | 5/2007 | Kataoka et al. | ............. | 715/508 |
| 7,257,776 B2 * | 8/2007 | Bailey et al. | ................ | 715/788 |
| 2002/0089523 A1 * | 7/2002 | Hodgkinson | ................ | 345/660 |

FOREIGN PATENT DOCUMENTS

EP    1052598 A    11/2000
WO    WO0174065 A    10/2001

* cited by examiner

*Primary Examiner*—William L. Bashore
*Assistant Examiner*—Andrew Tank
(74) *Attorney, Agent, or Firm*—Lee & Hayes, PLLC

(57) ABSTRACT

An adjustment is made to the size of an original graphic data object in a substantially rectangular original screen to obtain a target graphic data object on a substantially rectangular target screen having a different aspect ratio than that of the original screen. The size of the original graphic data object is proportionally increased to obtain the target graphic data object on the target screen. The size of the target graphic data object on the target screen is non-proportionally increased by the addition of a stretch distance thereto where a line projecting from a resizing point on and perpendicular to an edge of the original screen intersects the original graphic data object.

45 Claims, 14 Drawing Sheets

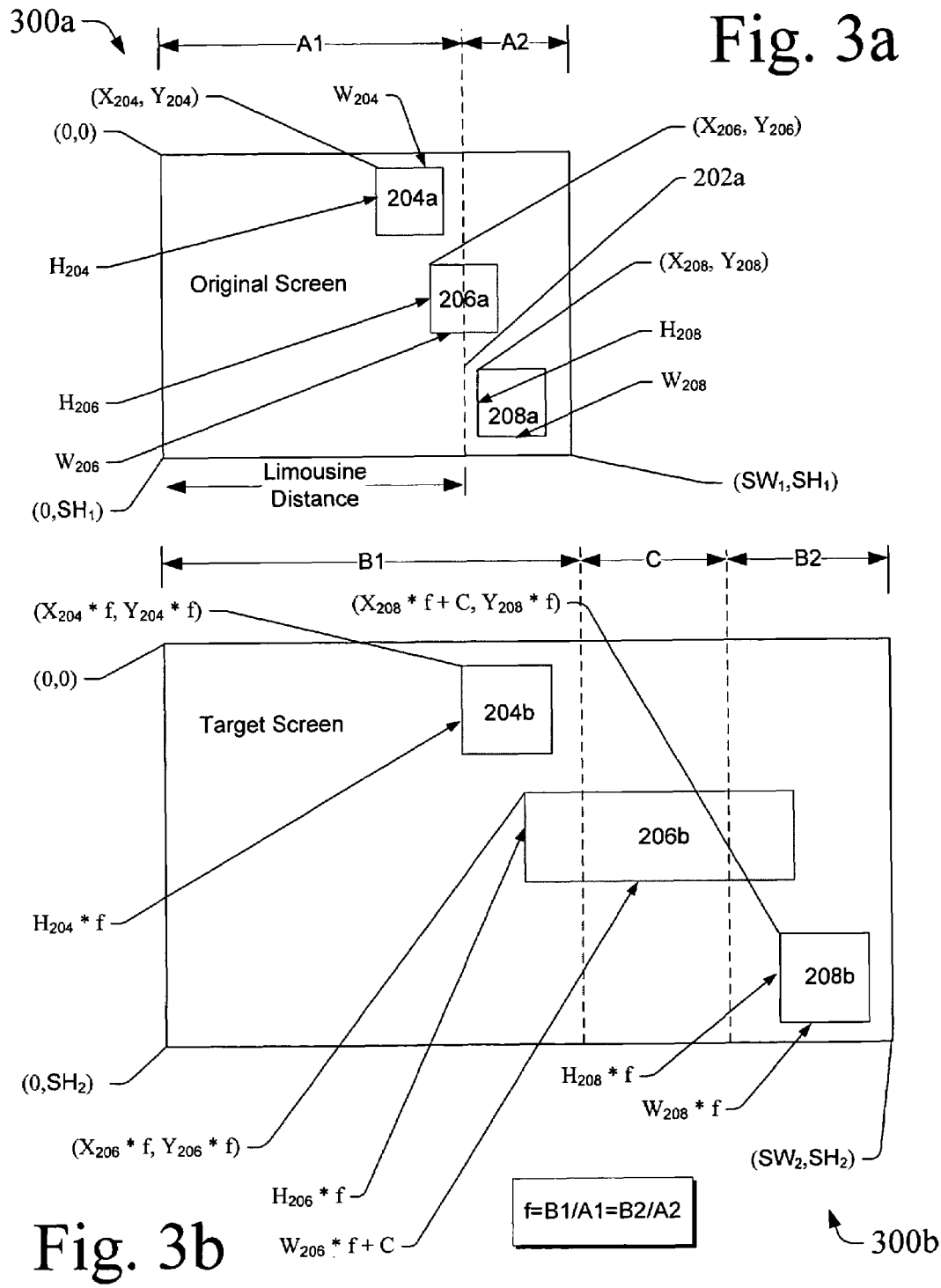

1000a

1000b

CONTROLLED NON-PROPORTIONAL SCALING DISPLAY

TECHNICAL FIELD

The present invention relates generally to audio-video entertainment systems, and more particularly to video on demand services.

BACKGROUND

Today's televisions have various screen sizes, including width to height aspect ratios of 4:3 and 16:9. Interactive television (iTV) software should be able to accommodate video and graphics to fit these different screen sizes. One technique is to simply stretch a normal screen display to fit the new screen size. This technique can lead to non-esthetic distortion of on-screen graphical data objects. A user of iTV may have a heightened recognition of a distorted or misshapen on-screen graphical data object because of the user's interacting with the graphical data object, such as with a radio button, a slide bar, or a box to be checked. Another technique is to employ the cooperative efforts of a screen designer to design a different screen for each screen of a different aspect ratio and of a programmer to accommodate each different screen design with proper functionality. This cooperative effort, however, is costly. It would be an advantage in the art to provide a technique to accommodate video and graphics to fit different screen sizes without non-esthetic distortion of on-screen graphical data objects and without adding significant cost.

SUMMARY

Implementations provide for cost savings by permitting a designer to design an original screen that can be transformed, without screen-specific programming, into a target screen having a different resolution or aspect ratio without giving a distorted appearance to graphical data objects on the target screen. The transformation is effected by designating a "limousine" line on the original screen that is normal to and intersects with an axis at a limousine point that is designated by a designer of the original screen. A graphical data object on the original screen that intersects the limousine line is subjected to both a proportional and a non-proportional stretching while other graphical data objects on the original screen are subjected to a proportional stretching. This limousine stretching technique achieves a target screen having on-screen graphical data objects that do not have a distorted appearance.

In one implementation, a substantially rectangular target screen has a different aspect ratio than a substantially rectangular original screen. The original screen has been designed with a limousine or resizing point on one of its edges. A perpendicular line from the resizing point intersects an original graphic data object on the original screen. The original graphic data object is proportionally increased in size to obtain a target graphic data object on the target screen. A stretch distance is also added to the size of the target graphic data object on the target screen. The proportional increase in size is according to the smaller of the width ratio and height ratio of the target and original screens. When the proportional increase in size is according to the height ratio, then the stretch distance is calculated by subtracting the product of the height ratio and the width of the original screen from the width of the target screen. When the proportional increase in size is according to the width ratio, then the stretch distance is calculated by subtracting the product of the width ratio and the height of the original screen from the height of the target screen. Once formed, the target graphic data object can be output on a display of the target screen.

BRIEF DESCRIPTION OF THE DRAWINGS

A more complete understanding of the implementations may be had by reference to the following detailed description when taken in conjunction with the accompanying drawings wherein:

FIGS. 2a-3a and FIGS. 2b and 3b respectively show a display screen before and after a limousine stretching, where the display screen of FIGS. 2a-3a has an object to the left of a limousine line, an object that is straddling the limousine line, and an object to the right of the limousine line.

FIG. 8b depicts the EPG screen of FIG. 8a having been scaled non-proportionally to a dimension of 576 pixels by 360 pixels, where space on the screen has not been used as effectively as the space used in the limousine scaled screen depicted in FIG. 8a.

Figure 1:
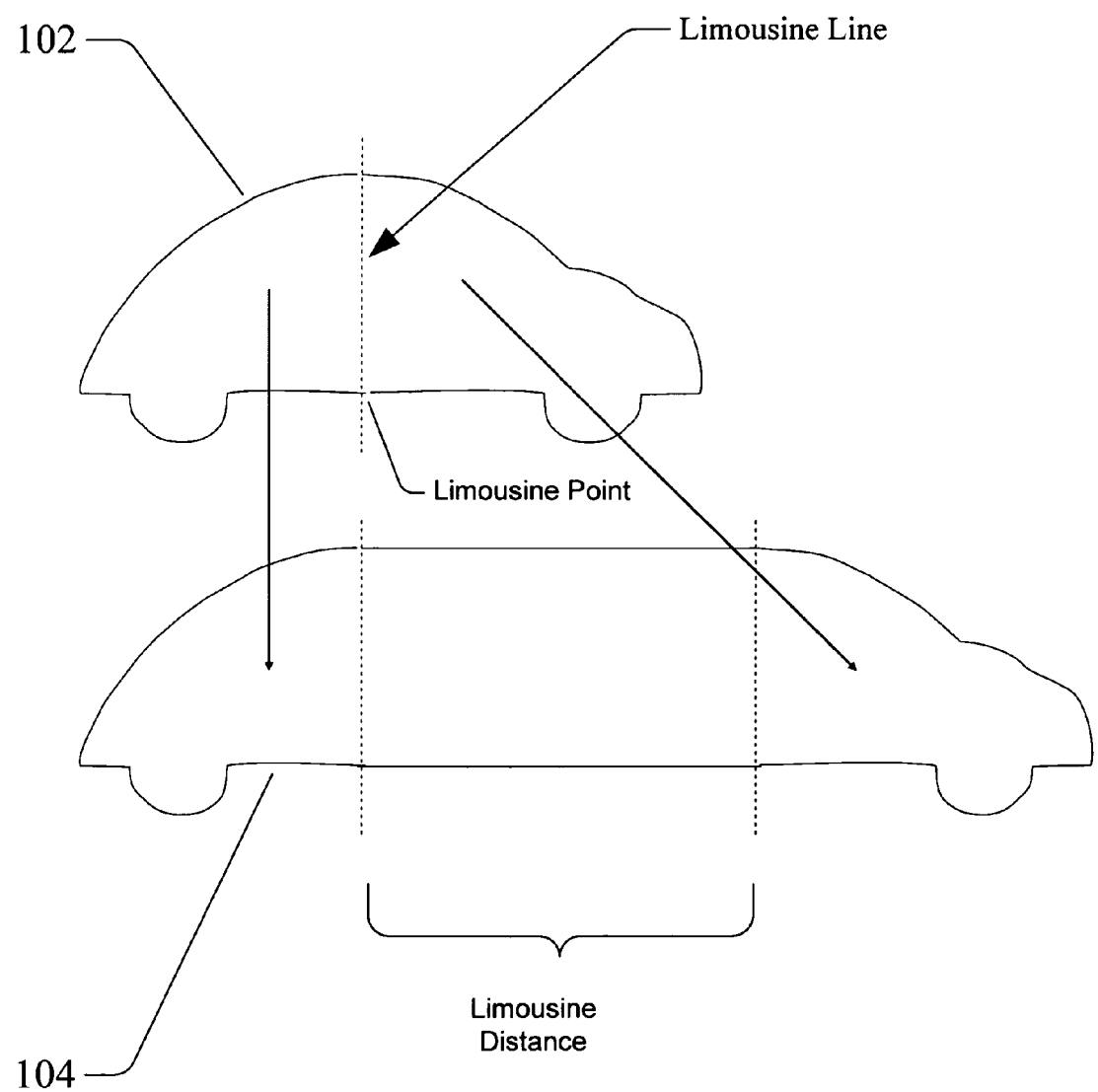
FIG. 1 shows a display screen featuring an outline of an automobile before and after a limousine stretching.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Various implementations provide a limousine stretching technique for transforming an original screen of an original dimension and having a graphical data object thereon into a target screen having a different target dimension and a resized graphical data object thereon. By use of the limousine stretching technique, the graphical data object in the original screen is scaled non-proportionally into the target screen without giving a distorted appearance to the graphical data object on the target screen. The limousine stretching technique defines a limousine point on a horizontal axis. A normal, called herein a 'limousine line', is extended from the limousine point so as to intersect with the graphical data object on the original screen. Each graphical data object on the original screen with which the limousine line intersects will be non-proportionally stretched. Any other graphical data object on the original screen will be proportionally stretched. Stated otherwise, graphical elements to the left or right of the limousine line are scaled proportionally, and graphical elements that straddle the limousine line are stretched non-proportionally. The non-proportional stretching of the graphical data object enables the user interface (UI) to fit the resolution (e.g., dimension or aspect ratio) of the target screen. A designer of an original screen or a template for original screens can select a limousine point to ensure that the graphical data objects to appear on the target screen will be esthetically distorted without a noticeable loss of quality.

To transform the original screen of the original dimensions into the target screen having the target dimensions, the graphical data objects on the original screen are stretched proportionally and non-proportionally as set forth above. The stretched graphical data objects are placed accordingly on the target screen. The limousine stretching technique provides an esthetic presentation of the graphical data objects on the target screen without appearing distorted.

A designer can designate a limousine point on an original screen or on a screen template. The limousine point can be communicated to a client, such as a set top box. When the client receives media having a first resolution or dimension that is to be transformed into a second, different resolution or dimension, the client will execute a routine having the limousine stretching technique. The executed routine will transform the media intended for an original screen into a target screen to which the client is to output a display. In so doing, graphical data objects on the target screen will not have a distorted or misshapen appearance.

Advantageously, with the limousine stretching technique, a designer only needs to design one original screen for one resolution or dimension, instead of having to design an original screen for each possible resolution or dimension. Moreover, a special program is not needed for each type of original screen to transform the same into a special type of target screen. As such, embodiments enable a designer to use one design for a television user interface that, through the use of the limousine stretching technique, can be presented at multiple screen aspect ratios. One original user interface can be designed that can be used to create target screens at any one of the following screen resolutions or dimensions which can in turn be transformed into the other resolutions or dimensions: the NTSC resolution 640 pixels×480 pixels, the PAL resolution 720 pixels×576 pixels, the NTSC resolution 576 pixels× 480 pixels, the High Definition TV (HDTV) resolution 1280 pixels×720 pixels, the HDTV resolution 1960 pixels×1080 pixels. The target screens so created have an esthetic appearance in that they do not appear to be stretched, but rather look as if they'd been designed.

Implementations of the limousine stretch technique provide control over how graphical data objects in an original screen design are stretched to make the target scaled user interface look undistorted while also functioning correctly. Some graphical data objects on an original screen can be designed by a designer so as to be exempted from being non-proportionally scaled. These graphical data objects would rather be scaled using special proportional techniques. For example, text characters in an original screen can be re-rendered at a font size that is appropriate for the scaled space of the corresponding target screen. Still other graphical data objects can be designated for other types of stretching with different stretch distances in the horizontal and vertical dimensions. A still further refinement of stretching techniques allow for stretch distances to be applied to graphical data objects differently, depending on an object's position on the original screen.

On-screen graphical data objects can be divided into two classes. In the first class are elements which cannot esthetically be scaled differently in horizontal and vertical directions such that these elements look their best when they retain their original respective aspect ratios. By way of example, these elements include letter forms, scaled picture-in-picture displays, and corporate logos where the preservation of a recognizable commercial impression is desirable. Other of such graphical elements are regular shapes that are commonly recognized as being distorted when changed, such as squares and circles. An eight-side polygon, such as the common traffic stop sign, is another example of a graphical data object for which the aspect ratio should not be altered on a target screen because of the otherwise distorted appearance that will result. For these types of graphical data objects, a proportional scaling technique can be applied to preserve the original aspect ratio. For text, such as letter forms, a new font point size can be identified that will accommodate the required text in the proportionally-scaled text area of the target screen. The text is then drawn on the target screen using the identified font point size.

In the second class are on-screen graphical elements that can be scaled differently (e.g., non-proportionally) in the vertical and horizontal dimensions for the target screen. The second class includes on-screen interactive buttons, text areas, some images, lines, rectangles, and other shapes. The second class of objects is scaled using different scaling factors in the vertical and horizontal dimensions.

The technique of limousine-scaling or limousine stretching is an approach that can be used to scale an automobile into a limousine and can scale rounded rectangles into rounded rectangles having a different aspect ratio. A "limousine point" is defined on a horizontal axis from which a normal limousine line is extended onto the original screen. Graphical data objects to the left of the limousine line are scaled proportionally and placed on the left side of the target screen. Graphical data objects to the right of the limousine line are scaled proportional and placed on the right side of the target screen. Each graphical data object that straddles or intersects the limousine line is stretched non-proportionally across the center area thereof between the left and right sides of the target screen. The stretching is computationally inexpensive so that it can be performed on a thin client, such as a set top box, and yields esthetic, undistorted appearances of the resultant graphical data objects.

A designer of an original screen, or of a template for screens, can be selective about the parts of the screen that are to be distorted. The designer can set or define the limousine point globally for each original screen or for all screens that are designed from a template. The designer can, if needed, identify certain classes of graphical data objects that are to be proportionally stretched when changing the resolution from a designed original screen to a target screen.

The scaling technique also allows reuse of existing designs and design processes. Designs that are tailored to the widely used 4:3 aspect ratio for TV screens can also be used for the 16:9 aspect ratio TV screens. The design process is visual and does not require programming skills. A user interface layout can be described in a simple declarative format, and a software runtime engine that performs the layout and scaling can run in very resource-constrained environments, such as in a conventional set top box.

FIG. 1 shows a profile image of an automobile 102 before a limousine stretch and a profile image of an automobile 104 after a limousine stretch. Automobile 102 has a limousine point on an axis to which a limousine line is drawn as a normal so as to extend to both automobiles 102 and 104. The area under the limousine line of automobile 102 is stretched by a distance labeled as "limousine distance" on automobile 104. As such, automobile 104 appears to be limousine version of automobile 102.

Figure 2A:
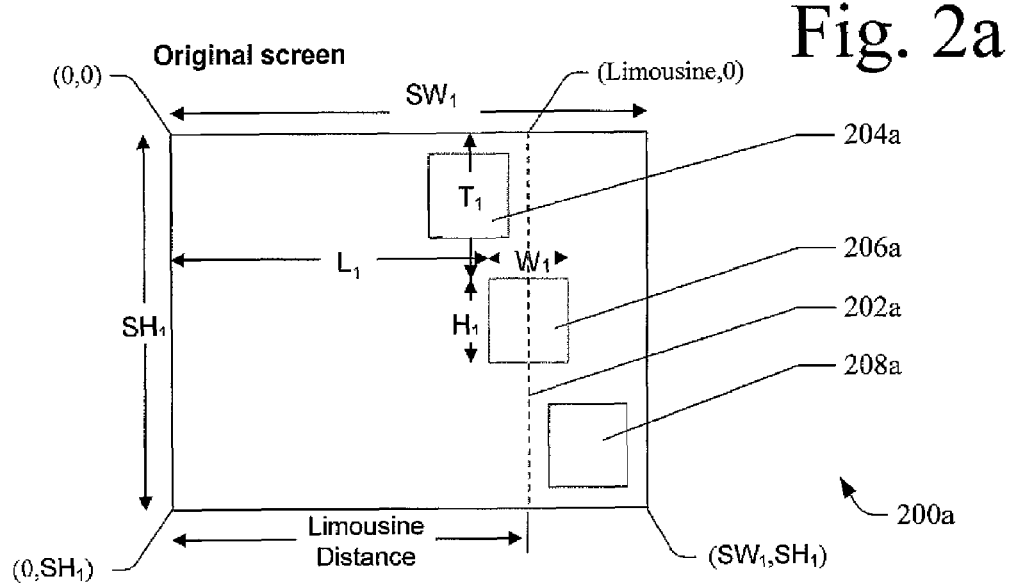
Figure 2B:
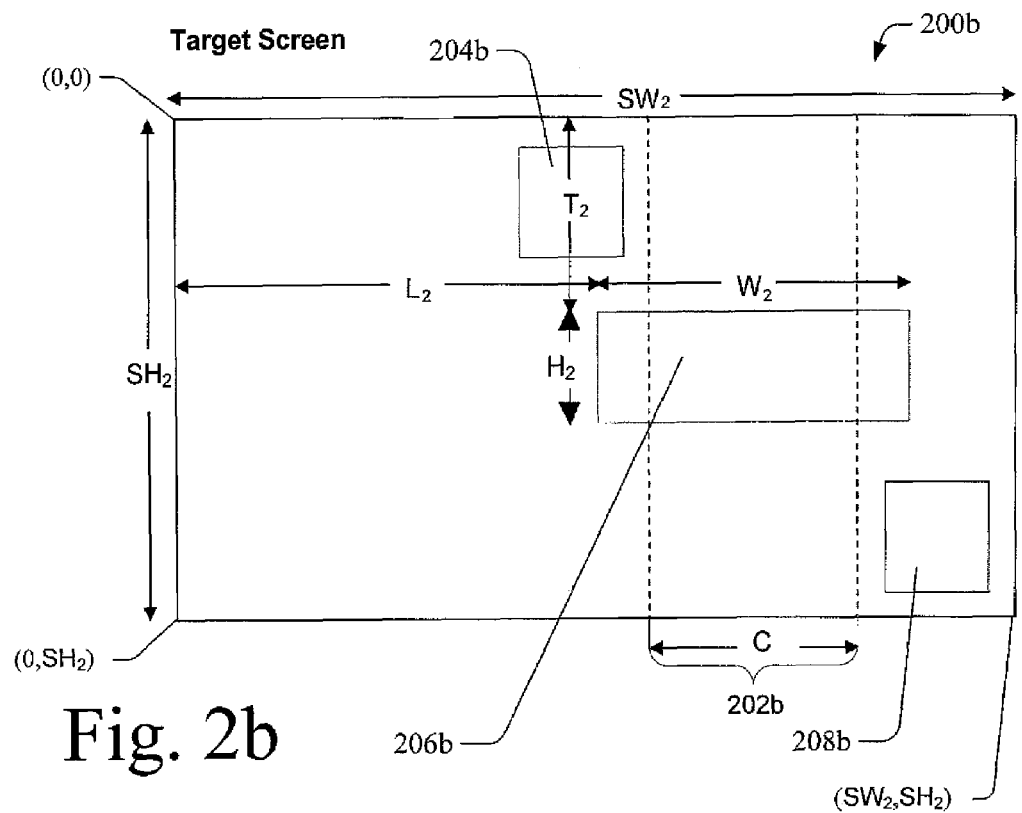

FIG. 2a is an original screen 200a that is transformed by limousine stretching into the target screen 200b depicted in FIG. 2b. The upper left corner of each screen represents the (0,0) point at an intersection of horizontal and vertical axes, where the horizontal axis increments positively to the right of the page, and the vertical axis increments positively towards the bottom of the page. The width and height of the original screen 200a are, respectively, $SW_1$ and $SH_1$. The width and height of the target screen 200b are, respectively, $SW_2$ and $SH_2$. The lower right corner of each screen represents, respectively, the ($SW_1$, $SH_1$) point and the ($SW_2$, $SH_2$) point. The lower left corner of each screen represents, respectively, the (0, $SH_1$) point and the (0, $SH_2$) point.

A limousine point on original screen 200a is marked at the limousine point (Limousine,0). A limousine line 202a is drawn normal to the x axis of the original screen 200a on which limousine point (Linousine,0) is situated. The limousine point (Linousine,0) is to the right of the left edge of original screen 200a by a distance of represented as "Limousine Distance" in FIG. 2a. Three (3) graphical data objects 204a, 206a, 208a are seen on original screen 200a. Object 204a is to the left of limousine line 202a, object 206a straddles limousine line 202a, and object 208a is to the right of limousine line 202a. Object 206a has a width $W_1$ and a height $H_1$. The top edge of object 206a is below the top of original screen 200a by a distance of $T_1$. The left edge of object 206a is to the right of the left edge of original screen 200a by a distance of $L_1$.

FIG. 2b shows the result of limousine scaling of objects 204a, 206a, and 208a into objects 204b, 206b, and 208b from original screen 200a to target screen 200b. Original screen 200a has been scaled by width and height from $SW_1$ to $SW_2$ and from $SH_1$ to $SH_2$, respectively. The area of object 206a under limousine line 202a has been non-proportionally stretched by a distance of 202b, which is also referenced as the distance "C" in FIG. 2b.

An original screen 300a in FIG. 3a is identical to the original screen 200a in FIG. 2a, although additional reference numerals and other references have been added. An target screen 300b in FIG. 3b is identical to the target screen 200b in FIG. 2b, although additional reference numerals and other references have been added. The upper left corner of each of object 204a, 206a, and 208a is, respectively, ($X_{204}$, $Y_{204}$), ($X_{206}$, $Y_{206}$), ($X_{208}$, $Y_{208}$). The width and height of each of object 204a, 206a, and 208a is, respectively, $W_{204}$ and $H_{204}$, $W_{206}$ and $H_{206}$, and $W_{208}$ and $H_{208}$. Limousine line 202a is a distance of A1 from the left edge of original screen 300a and a distance of A2 from the right edge of original screen 300a.

A target screen 300b in FIG. 3b is identical to the target screen 200b in FIG. 2b, although additional reference numerals and other references have been added. The respective area under limousine line 202a in FIGS. 2a and 3a has been stretched as in FIGS. 2b and 3b to create two lines, one being a distance of B1 from the left edge of target screen 300b, and the other being a distance of B2 from the right edge of target screen 300b. A factor 'f' is used to transform original screen 200a-300a to target screen 200b-300b, where f=B1/A1=B2/A2. As such, the upper left corner of each of object 204b, 206b, and 208b is, respectively, ($X_{204}$*f, $Y_{204}$*f), ($X_{206}$*f, $Y_{206}$*f), ($X_{208}$*f+C, $Y_{208}$*f), and the width and height of each of object 204b, 206b, and 208b is, respectively, $W_{204}$*f and $H_{204}$*f, $W_{206}$*f+C and $H_{206}$*f, and $W_{208}$*f and $H_{208}$*f. Preferably, the smallest change between height and width, from the original to the target screen, will be used for the 'f' factor. By way of example, if $SH_1$ and $SW_1$ were both 10 units and $SH_2$ and $SW_2$ were 20 units and 50 units, then a re-sizing 'f' factor of '2' would be used in the transformation of the original screen of FIGS. 2a and 3a into the target screen of FIGS. 2b and 3b.

Figure 4A:
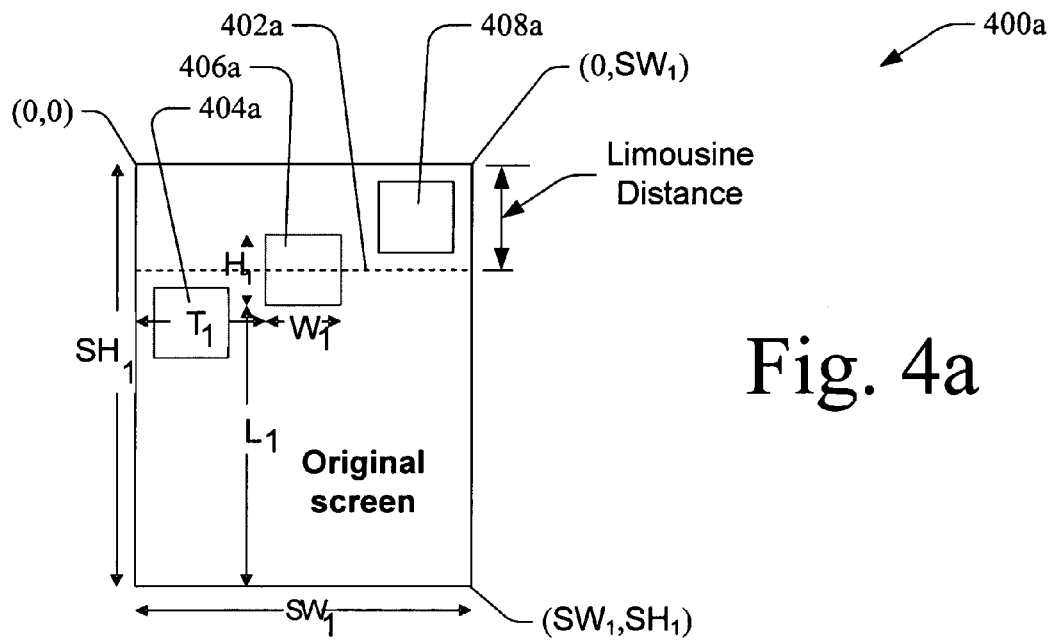
FIGS. 4a-4b show a display screen before and after a limousine stretching, where the display screen of FIG. 4a has an object above a limousine line, an object that is straddling the limousine line, and an object below the limousine line.
Figure 4B:
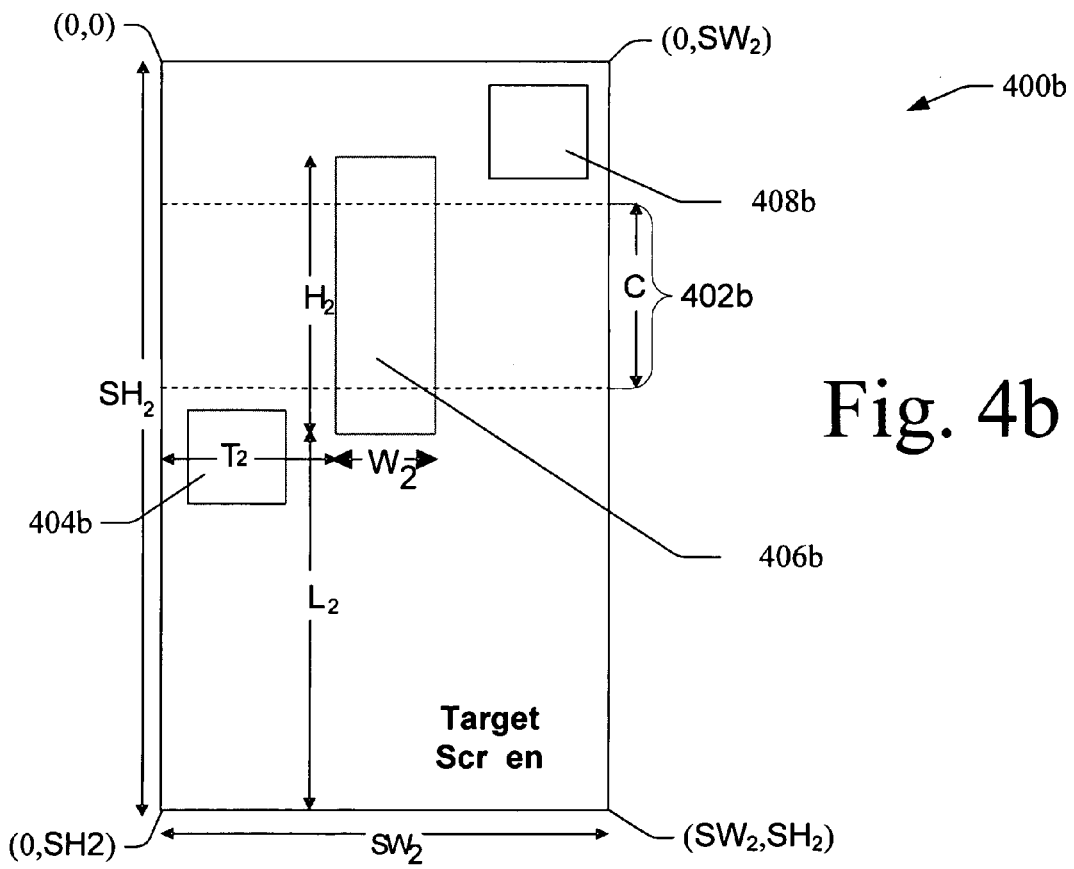

FIG. 4a shows show an original display screen 400a before a limousine stretching. FIG. 4b shows show a target display screen 400b after the limousine stretching. The change in the height of the target screen from that of the original screen is greater than change in the width of the target screen from that of the original screen. A limousine line 402 is seen extending between the left and right edges of the original screen. FIG. 4a shows that the display screen 400a before the limousine stretching has an object 408a above the limousine line 402a, an object 406a that is straddling the limousine line 402a, and an object 404a below the limousine line 402a. FIG. 4b shows that the objects above and below the limousine line 402a have been proportionally re-sized, whereas the object 406a straddling the limousine line 402a has been both proportionally and non-proportionally re-sized. The proportional re-sizing of the object 406a straddling the limousine line 402a is the same as the other two objects 408a, 404a, but the non-proportionally re-sizing of the object 406a is directed in a stretching in the vertical direction of target screen 400b. The factors of A1, A2, B1, B2, and C are measured similarly as were discussed with respect to FIGS. 2a, 2b, 3a, and 3b. Accordingly, target screen 400b in FIG. 4b shows the case where the height to width aspect ratio is greater than one. In this case, the non-proportionally re-sizing of the object 406a is subjected to a vertical stretch due to the larger increment in the vertical distance of target screen 400b.

Figure 5:
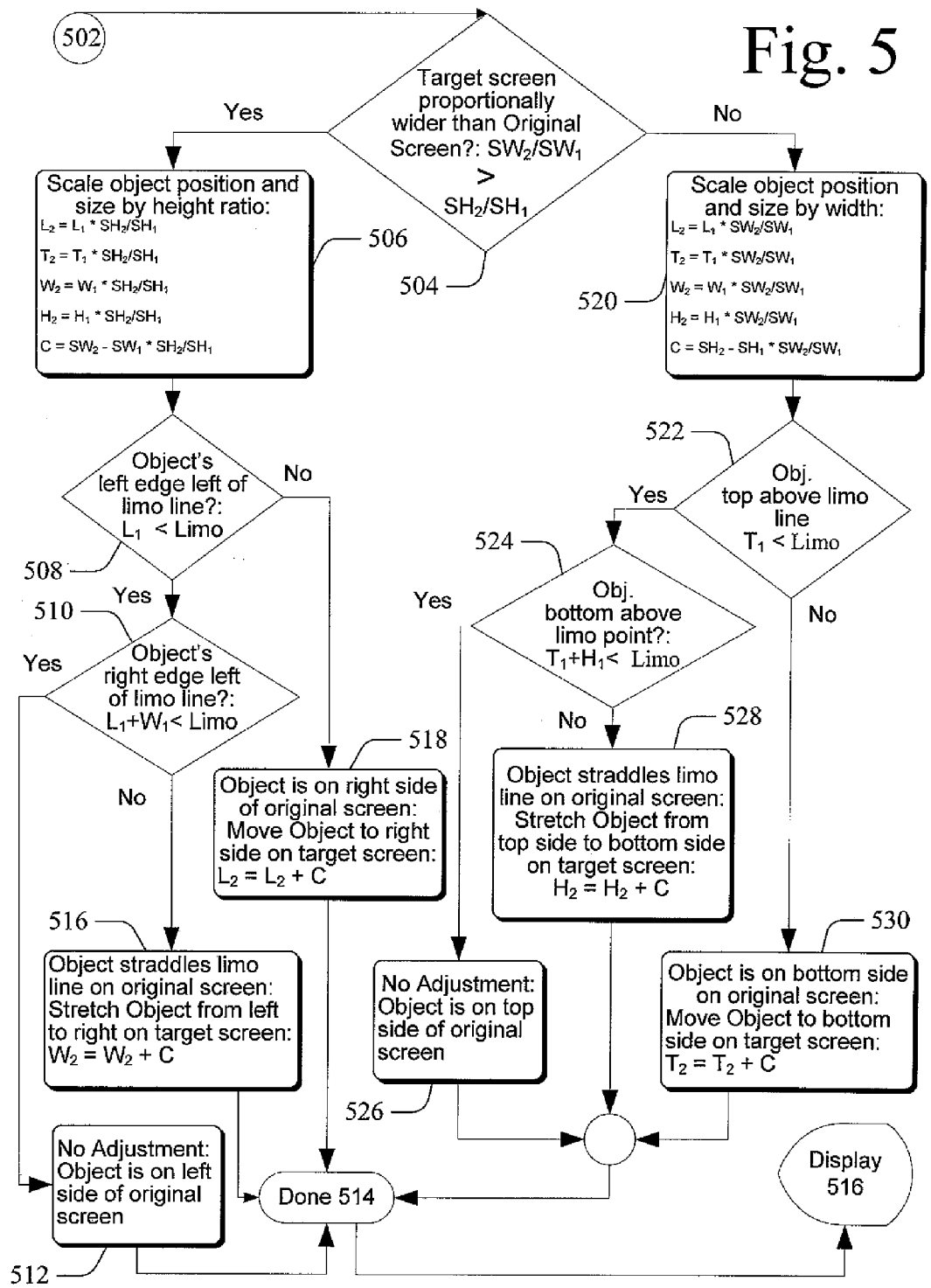
FIG. 5 is a flow chart depicting an implementation of a process for limousine scaling the original graphical data objects depicted in FIGS. 2a, 3a, and 4a into the target graphical data objects depicted in FIGS. 2b, 3b, and 4b, respectively.

FIG. 5 shows a flowchart for a process 500 for the limousine scaling of all objects on an original screen to a target screen. Each object on the original screen in subjected to the process 500 which begins at block 502 and proceeds to block 504 at which a query is made as to whether the target screen is proportionally wider than the original screen. This query is determined by a comparison of $SW_2/SW_1 > SH_2/SH_1$. If the answer to the query at block 504 is affirmative, then process 500 moves to block 506 to begin the scaling of the object's position and size by a height ratio. At block 506, several calculations are made with the widths and heights seen in FIG. 2a to arrive at the widths and heights that are seen in FIG. 2b. The calculations at block 506 are as follows:

$$L_2 = L_1 * SH_2/SH_1$$

$$T_2 = T_1 * SH_2/SH_1$$

$$W_2 = W_1 * SH_2/SH_1$$

$$H_2 = H_1 * SH_2/SH_1$$

$$C = SW_2 - SW_1 * SH_2/SH_1$$

Process 500 then moves control to block 508. At block 508, a query determines, by a length comparison of $L_1 <$ Limousine Distance (Limo), if the left most edge of object 206a is to the left of the limousine line 202a. If so, then another query is made at block 510 to determine, by a length comparison of $L_1 + W_1 <$ Limo, if the right most edge of object 206a is to the left of the limousine line 202a. If so, then it is determined that object 206a is on the left side on the original screen, so no adjustments are needed to object 206a. Process 500 then is complete with this aspect of the transformation of object 206a of the original screen to object 206b of the target screen.

If the answer is negative to the query at block 508, then it is determined at block 518 that object 206a is on the right side on the original screen, and that object 206a is to be moved to the right side of the target screen. This move is expressed by the calculation $L_2 = L_2 + C$. Process 500 then is complete with this aspect of the transformation of object 206a of the original screen to object 206b of the target screen.

If the answer is negative to the query at block 510, then it is determined at block 516 that object 206a straddles the limousine line 202a on the original screen. For this determination, it is further determined that object 206a is to be stretched from the left to the right on the target screen. This stretching is expressed by the calculation $W_2 = W_2 + C$. Process 500 then is complete with this aspect of the transformation of object 206a of the original screen to object 206b of the target screen.

If the result of the query at block 504 is that the target screen is not proportionally wider than the original screen, the process 500 encompasses, by way of example, the scaling of the original objects that are seen in FIG. 4a, where the limousine line 402a intersects the original object 406a. Process 500 moves to block 520 at which various calculations are made:

$$L_2 = L_1 * SW_2/SW_1$$

$$T_2 = T_1 * SW_2/SW_1$$

$$W_2 = W_1 * SW_2/SW_1$$

$$H_2 = H_1 * SW_2/SW_1$$

$$C = SH_2 - SH_1 * SW_2/SW_1$$

Process 500 then moves control to block 522. At block 522, a query determines, by a height comparison of $T_1 <$ Limo, if the top most edge of the original object is above the limousine line. If so, then another query is made at block 524 to determine, by a height comparison of $T_1 + H_1 <$ Limo, if the bottom most edge of the original object is to above the limousine line. If so, then it is determined that the original object does not need to be adjusted because the original object is on the top side of the original screen. Process 500 then is complete with this aspect of the transformation of the original object of the original screen to the target object of the target screen.

If the answer is negative to the query at block 522, then it is determined at block 530 that object 206a is on the bottom side of the original screen, and that the original object is to be moved to the bottom side of the target screen. This move is expressed by the calculation $T_2 = T_2 + C$. Process 500 then is complete with this aspect of the transformation of the original object of the original screen to the target object of the target screen.

If the answer is negative to the query at block 524, then it is determined at block 528 that the original object straddles the limousine line 402 on the original screen. From this determination, it is further determined that the original object is to be stretched in a direction from the top side of the original screen to the bottom side of the target screen. This stretching is expressed by the calculation $H_2 = H_2 + C$. Process 500 then is complete with this aspect of the transformation of the original object of the original screen to the target object of the target screen.

Following the transformation of all of the aspects of each object (204a, 206a, 208a, 404a, 406a, 408a) on the original screen to the respective aspects of each object (204b, 206b, 208b, 404b, 406b, 408b) on the target screen, the target screen can be displayed in a display 516. Implementations provide for an esthetically presented arrangement of the objects (204b, 206b, 208b, 404b, 406b, 408b) on the target screen of the display 516.

The examples given in FIGS. 2a through 4b provide for a shifting of graphical data objects along horizontal and vertical axes. For instance, an original screen can be a square shape having a dimension of 10 units by 10 units. The target screen can have a height of 20 units and a width of 50 units. In this case, the height to width aspect ratio is less than one for the target screen (i.e., 20/50). A horizontal shift of the graphical data objects would be performed due to the larger increment in the horizontal distance, from 10 to 50 as opposed to from 10 to 20, when resizing the original screen to the target screen. Alternatively, the target screen can but have a height of 50 units and a width of 20 units. In this case, the height to width aspect ratio is greater than one for the target screen (i.e., 50/20). A vertical shift of the graphical data objects would be performed due to the larger increment in the vertical distance, from 10 to 50 as opposed to from 10 to 20, when resizing the original screen to the target screen.

The transformation of an original screen of one resolution or aspect ratio into a target screen of a different resolution or aspect via the limousine stretching technique, as described above, can be reduced in computational complexity by use of integer arithmetic. Integer arithmetic can be run with limited computational resources typical of thin clients, such as set top boxes. By comparison, floating point arithmetic is much more expensive, especially on thin client such as set-top boxes that do not have floating point coprocessors. All computation can be done accurately using only integer arithmetic and no floating point arithmetic. Ultimately, the left, top, width and height values of each graphical data object on the target screen must rounded to integer values for display on a pixel-based device. In the examples given below, the "div" operator will be used to represent integer division and the "/" operator will be used to represent real number division. When scaling coordinates of the graphical data object from the original screen to the target screen, multiplication can be done before division to preserve the accuracy of the results. For example, the computation of the left coordinate can be perform as $L_2=(L_1*SW_2)\text{div } SW_1$ instead of $L_2=L_1*(SW_2 \text{ div } SW_1)$. On most computer systems, the integer division operation between a positive numerator N and positive denominator D truncates or "rounds down" the result to the nearest integer introducing an error E, where $-1<E\leq 0$. By multiplying before dividing, the total error is limited to $E_a$ where $-1<E_a\leq 0$. If division is done before multiplication, the error of the division operation $E_b$ where $-1<E_b\leq 0$ gets multiplied by $L_1$ resulting in a larger total error $E_c$ where $-L_1<E_c\leq 0$. Thus, we minimize the total error by performing multiplication before division. Integer division between positive numerator N and positive denominator D truncates or "rounds down" the result to the nearest integer, but it is also easy to achieve the effect of rounding up using integer arithmetic. By adding D−1 to N before doing in integer division by D, we can achieve the effect of rounding up. It is desirable to round up the width and height calculations. By slightly adding to the growth of the object, a visual problem such as clipping can be avoided, such as where a portion of the clipped graphical data object would otherwise not be seen in the scaled target screen. This can be counterbalanced by rounding down the left and top coordinate calculations. This way, the error in the right and bottom coordinates is at most 1 unit in either direction.

$$-1<E_L\leq 0$$

$$-1<E_T\leq 0$$

$$0<E_W<1$$

$$0<E_H<1$$

$$-1<E_R=E_L+E_W<1$$

$$-1<E_B=E_T+E_H<1.$$

The calculations should be modified as follows to incorporate the proper rounding:

width ratio>height ratio:
left of limo:

$$L_2=(L_1*SH_2)divSH_1$$

$$T_2=(T_1*SH_2)divSH_1$$

$$W_2=(W_1*SH_2+SH_1-1)divSH_1$$

$$H_2=(H_1*SH_2+SH_1-1)divSH_1$$

straddling limo:

$$L_2=(L_1*SH_2)divSH_1$$

$$T_2=(T_1*SH_2)divSH_1$$

$$W_2=((W_1-SW_1)*SH_2+SH_1-1)divSH_1+SW_2$$

$$H_2=(H_1*SH_2+SH_1-1)divSH_1$$

right of limo:

$$L_2=((L_1-SW_1)*SH_2)divSH_1+SW_2$$

$$T_2=(T_1*SH_2)divSH_1$$

$$W_2=(W_1*SH_2+SH_1-1)divSH_1$$

$$H_2=(H_1*SH_2+SH_1-1)divSH_1$$

height ratio>width ratio:
above limo:

$$L_2=(L_1*SW_2)\text{div } SW_1$$

$$T_2=(T_1*SW_2)\text{div } SW_1$$

$$W_2=(W_1*SW_2+SW_1-1)divSW_1$$

$$H_2=(H_1*SW_2+SW_1-1)divSW_1$$

straddling limo:

$$L_2=(L_1*SW_2)divSW_1$$

$$T_2=(T_1*SW_2)divSW_1$$

$$W_2=(W_1*SW_2+SW_1-1)\text{div } SW_1$$

$$H_2=((H_1-SH_1)*SW_2+SW_1-1)divSW_1+SH_2$$

below limo:

$$L_2=(L_1*SW_2)divSW_1$$

$$T_2=((T_1-SH_1)*SW_2)divSW_1+SH_2$$

$$W_2=(W_1*SW_2+SW_1-1)divSW_1$$

$$H_2=(H_1*SW_2+SW_1-1)divSW_1$$

Figure 6A:
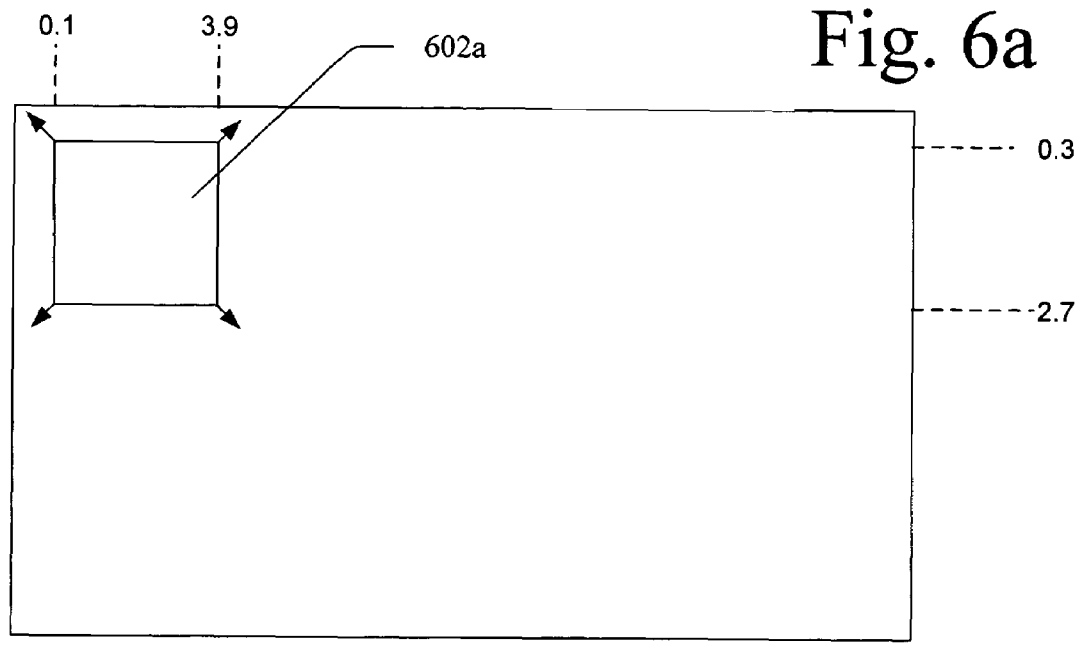
FIGS. 6a-6b depict a graphical data object on a target screen, respectively before and after the introduction of error by using integer mathematics for the positioning of the graphical data object on the target screen.
Figure 6B:
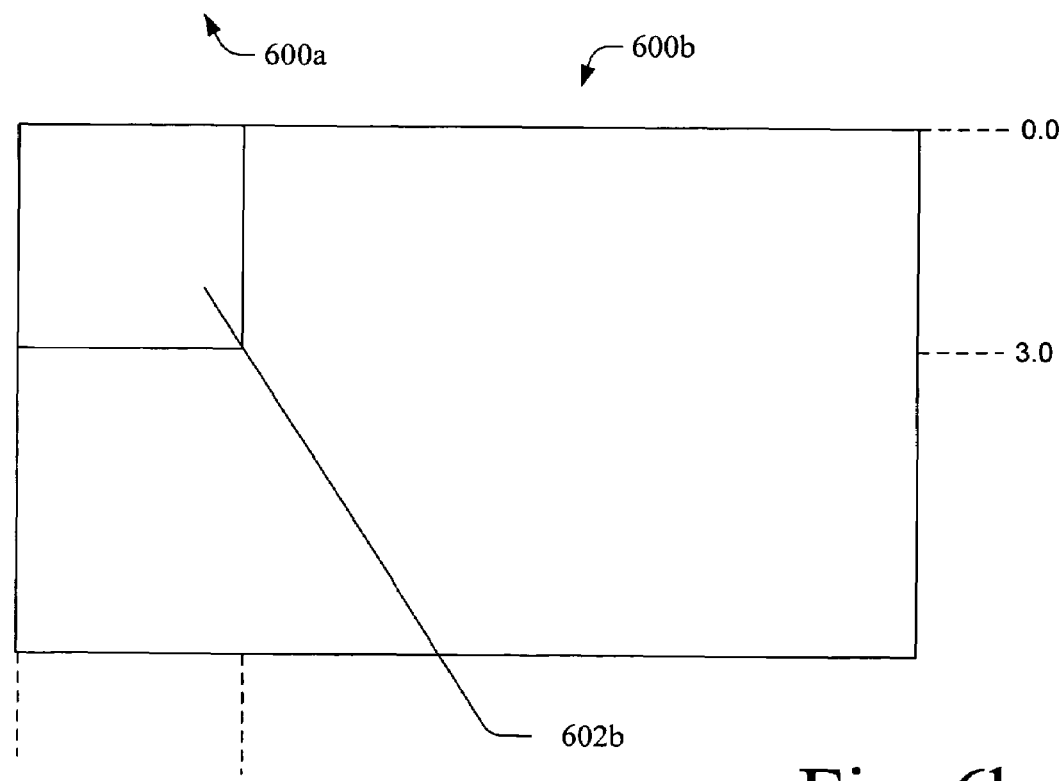

FIGS. 6a-6b provide an example of the foregoing technique for integer arithmetic to simplify mathematics of positioning objects on a target screen. FIG. 6a shows a graphical data object 602a on a rescaled target screen 600a prior to the introduction of rounding error. FIG. 6b shows a graphical data object 602b on a rescaled target screen 600b after to the introduction of rounding error. The rounding error so introduced enlarges object 602a to the size depicted for object 602b, where the width is moved from 0.1-3.9 to 0.0-4.0, and where the height is moved from 0.3-2.7 to 0.0-3.0. Thus, the position of object 602a was rounded down with respect to the top edge of the target screen and the left side of the target screen, and was rounded up with respect to the bottom edge of the target screen and the right side of the target screen. As such, graphical data object 602b has a resultant height of 3 and a width of 4. In summary, the size of the target graphic data object on the target screen seen in FIG. 6b has been increased by rounding to an integer value the coordinates of the target graphic data object on the target screen.

A designer can design a template having a height-to-width aspect ratio. The designer also specifies the type of graphical data objects that will appear on a screen that is formed from the template. For each type of graphical data object, the designer can further specify whether or not the object can be subjected to limousine stretching. For instance, the designer may specify that no corporate trademark or logo is to be limousine stretched, but is only to be proportionally stretched so as to maintain the original aspect ratio. The designer may further specify that text that will appear on a re-sized version of the original screen template is to be examined for an appropriate font point size that will appear best on the target screen and that the text will be drawn with the best font point size. Finally, the template designer will specify a limousine point on one of the edges of the screen, such as at the bottom edge. The designer can then specify that all other graphical data objects can be, by default, eligible to be limousine stretched when re-sizing a screen from its originally designed dimensions. Accordingly, the designer can design the original screen template to accommodate likely graphical data objects for likely target screens so as to preserve the esthetic appearance of the original screen template.

Figure 7:
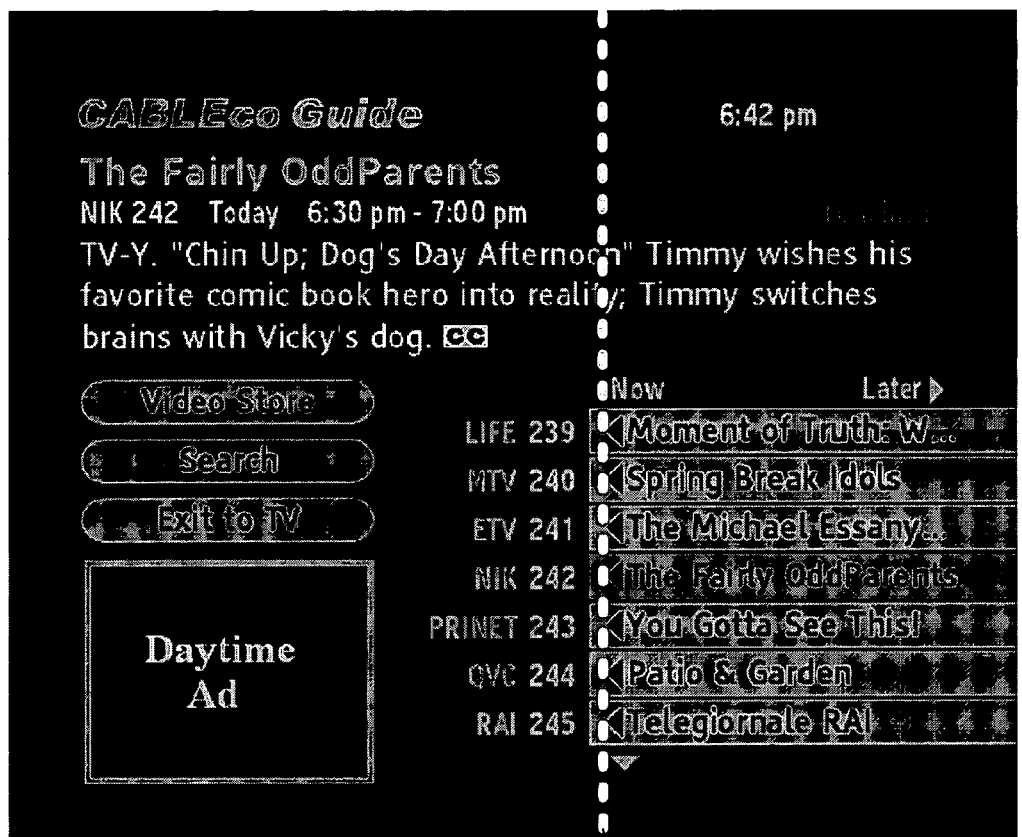
FIG. 7 depicts a main television guide or electronic programming guide (EPG) screen having an original 576 pixels by 480 pixels design, where a dashed line denotes a limousine line extending as a normal to a limousine point on a horizontal axis, where the limousine point and limousine line are to be used for limousine scaling.

FIG. 7 depicts a main television guide or electronic programming guide (EPG) screen having an original design resolution of 576 pixels by 480 pixels. The dashed line 702 depicts a limousine line that is designed by a screen designer that can be used for limousine scaling. The limousine line extends as a normal to a limousine point at the bottom edge of screen to intersect with a horizontal axis on the top edge of the screen.

Figure 8A:
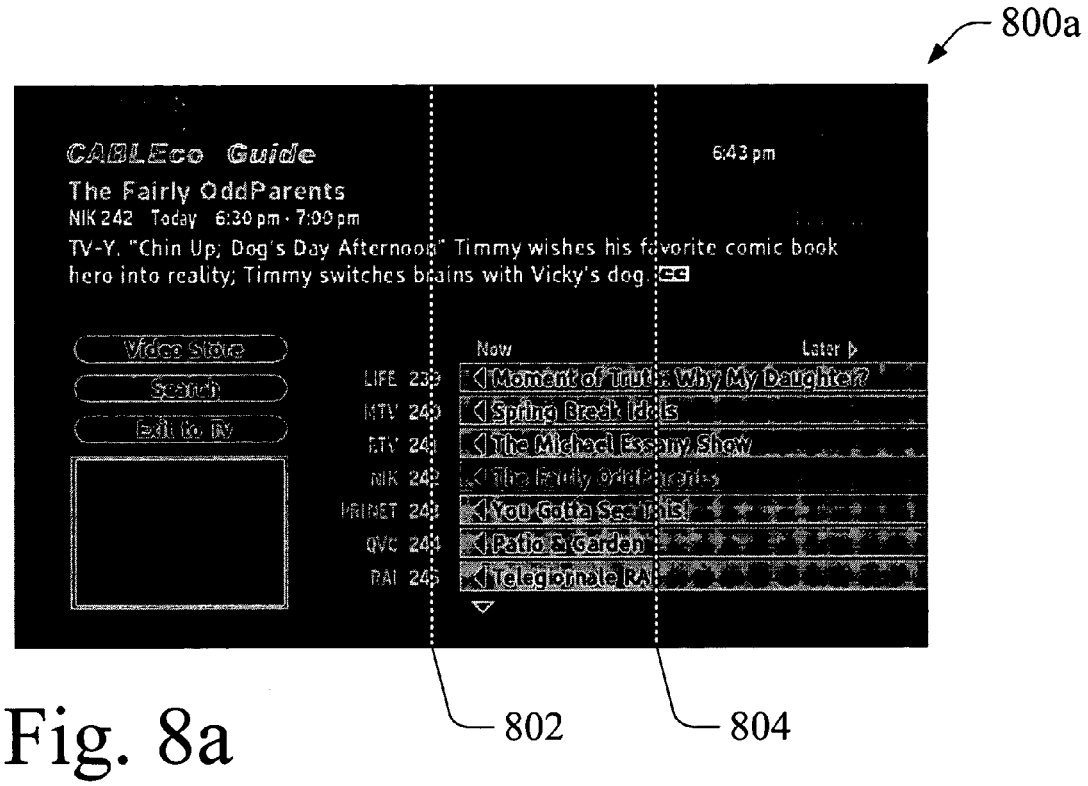
FIG. 8a depicts an EPG target screen that has been limousine scaled to a dimension of 576 pixels by 360 pixels, where graphical data objects have been scaled by a factor of 75% and the target screen height has been reduced to 75% of the height of the original screen seen in FIG. 7.

FIG. 8*a* depicts an EPG screen 800*a* that has been limousine scaled to a dimension of 576 pixels by 360 pixels, where objects have been scaled by a factor of 75% and the target screen height has been reduced to 75% of the height of the original screen. FIG. 8*a* shows interactive on-screen buttons for a "Video Store" function, a "Search" function, and an "Exit to TV" function. These buttons are seen on the left side of the screen and have the same proportions in the target screen as they do in the original screen so that their appearance on the target screen does not have a distorted appearance. The space on the target screen is used effectively by making the program listing section in the EPG on the right side of the target screen proportionally wider than on the original screen. This technique allows long titles, such as "Moment of Truth: Why My Daughter?", to be displayed without clipping.

FIG. 8*a* shows that graphic characteristics for, and the text attached to, the original graphic data objects on the original screen seen in FIG. 7 have been obtained and used in the target graphic data objects on the target screen of FIG. 8*a*. The attached text has been reformatted so as to correspond to the target graphic data objects on the target screen seen in FIG. 8*a*. Accordingly, the attached text esthetically fits within opposing top and bottom edges and opposing left and right edges of the target graphic data objects on the target screen of FIG. 8*a*. Additionally, the graphic characteristics for the original graphic data objects on the original screen in FIG. 7 (e.g., tone, borders, etc.) have been applied to the target graphic data objects on the target screen of FIG. 8*a*.

Figure 8B:
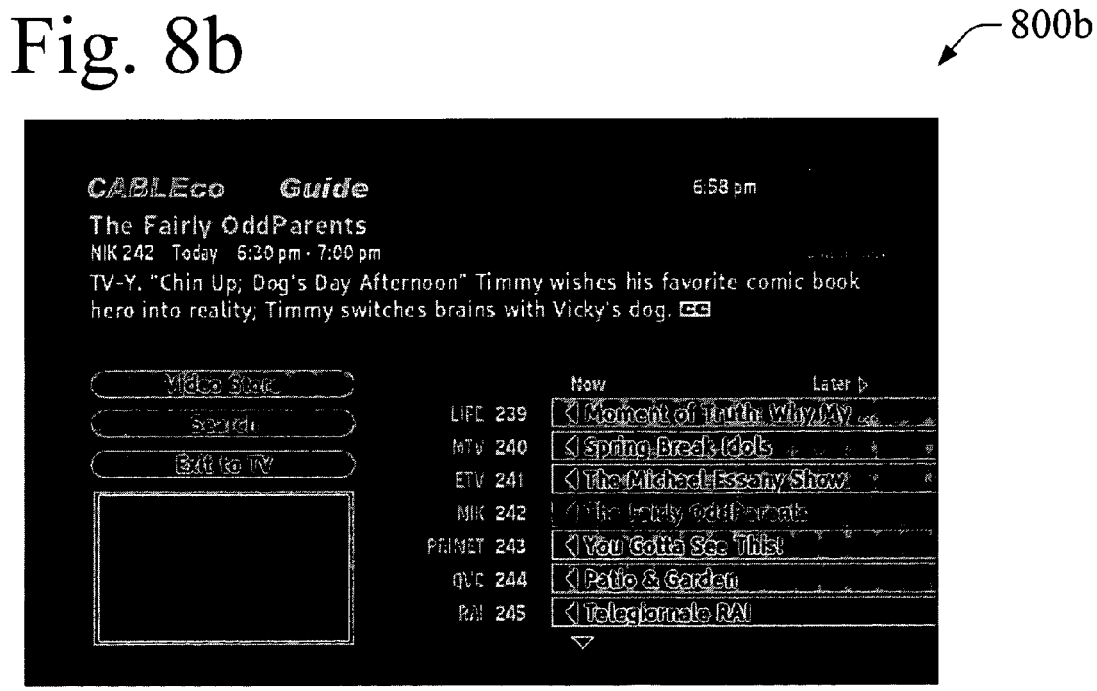

FIG. 8*b* depicts the EPG screen of FIG. 7 having been scaled non-proportionally to a dimension of 576 pixels by 360 pixels, where space on the screen has not been used as effectively as the space used in the limousine scaled screen depicted in FIG. 8*a*. The on-screen interactive buttons on the left side of the original screen for a "Video Store" function, a "Search" function, and an "Exit to TV" function have an appearance of being too wide. These buttons would be more esthetically pleasing if they had been stretched proportionally rather than to be rendered non-proportionally. Alternatively, the grid on the right side of the original screen can be stretched non-proportionally without appearing distorted. As such, the space at the right side of the screen 800*b* in FIG. 8*b* is not used as effectively as the space in the limousine scaled target screen depicted in FIG. 8*a*. Unlike in FIG. 8*a*, the text "Moment of Truth: Why My Daughter?" is truncated in FIG. 8*b*.

Figure 9:
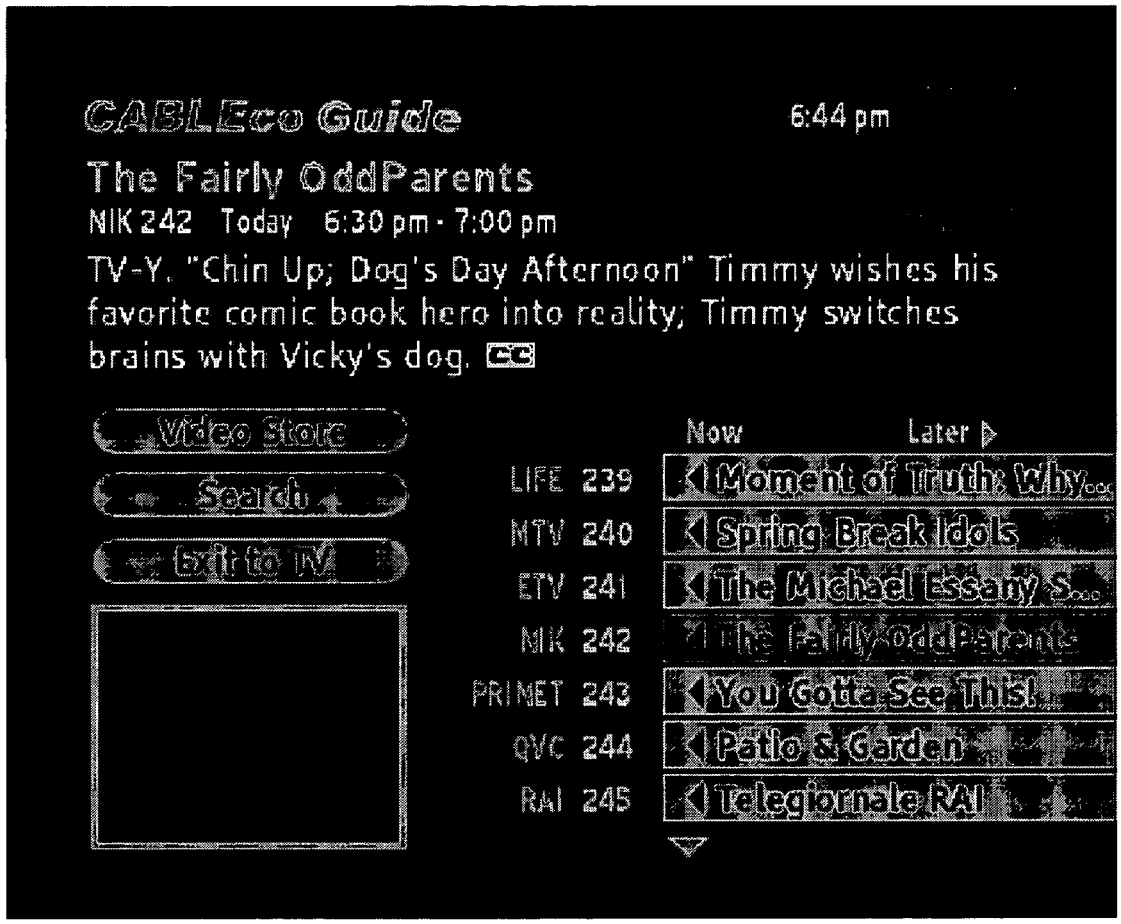
FIG. 9 depicts an EPG screen having been scaled proportionally to 432 pixels by 360 pixels, where limousine scaling is not needed because the target screen has the same proportions as the original screen and its graphical data objects do not have a distorted appearance.

FIG. 9 depicts an EPG screen 900 having been scaled proportionally to a resolution of 432 pixels×360 pixels. For this EPG screen, limousine scaling is not needed because the target screen has the same proportions as the original screen and thus does not have a distorted appearance.

Figure 10A:
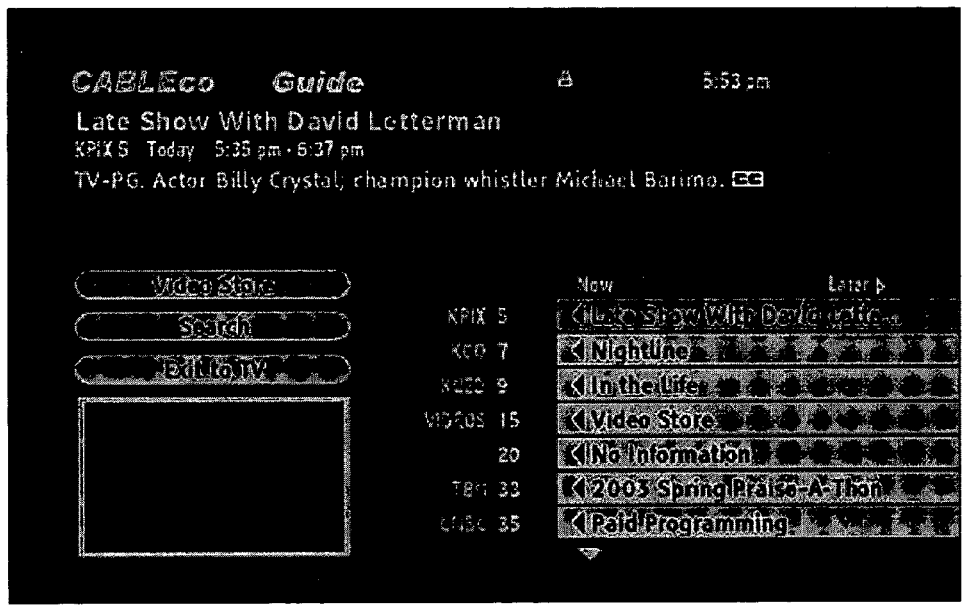
FIG. 10a depicts a screen having a dimension of 576 pixels by 360 pixels that has not been subjected to limousine stretching, where objects at the left side of the screen have the appearance of being stretched too wide.
Figure 10B:
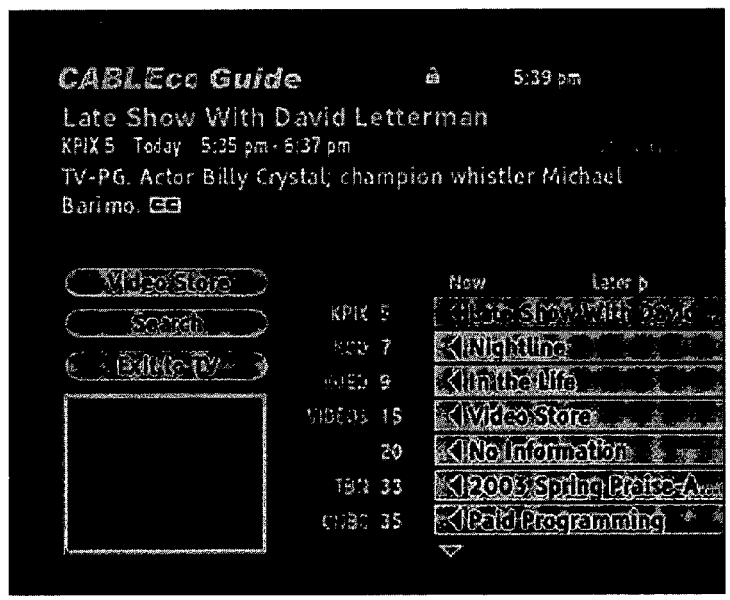
FIG. 10b depicts, for comparison purposes, the screen of FIG. 9 with different graphical data objects and a dimension of 432 pixels by 360 pixels, which is a proportionally scaled screen.

FIG. 10*a* depicts a screen 1000*a* having a dimension of 576 pixels by 360 pixels that has not been subjected to limousine stretching. Graphical data objects at the left side of the screen in the depicted scaled version look stretched and have a distorted appearance of being too wide. FIG. 10*b* depicts a screen 1000*b*, for comparison purposes, which is the screen of FIG. 10*a* as having a dimension of 432 pixels by 360 pixels, which is a proportionally scaled screen that has not been subjected to non-proportional limousine stretching.

Figure 11:
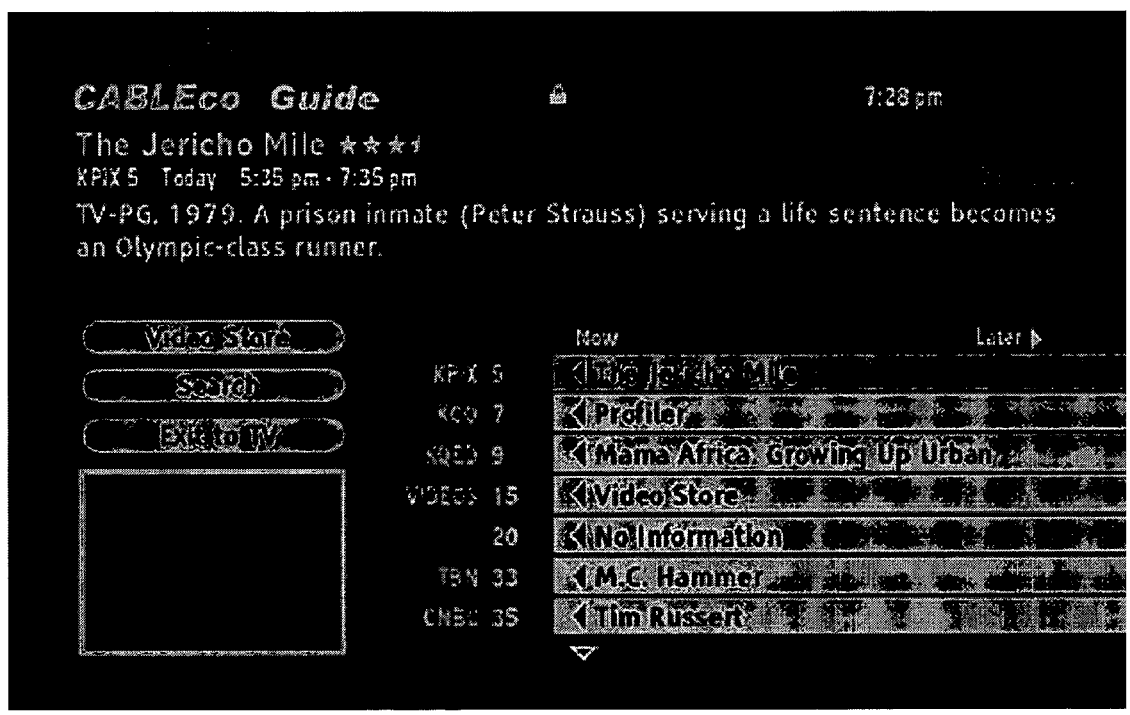
FIG. 11 depicts a target screen having a dimension of 576 pixels by 360 pixels with limousine scaling having been used to stretch most of graphical elements on the original screen towards the right side of the depicted target screen.

FIG. 11 depicts a screen 1100 having a dimension of 576 pixels by 360 pixels, where non-proportional limousine scaling has been used. Most of the graphical elements on the original screen have been stretched toward the right side of the target screen as depicted in FIG. 11. Limousine scaling is beneficial here in that the 'Video Store' button does not have a distorted appearance.

Figure 12:
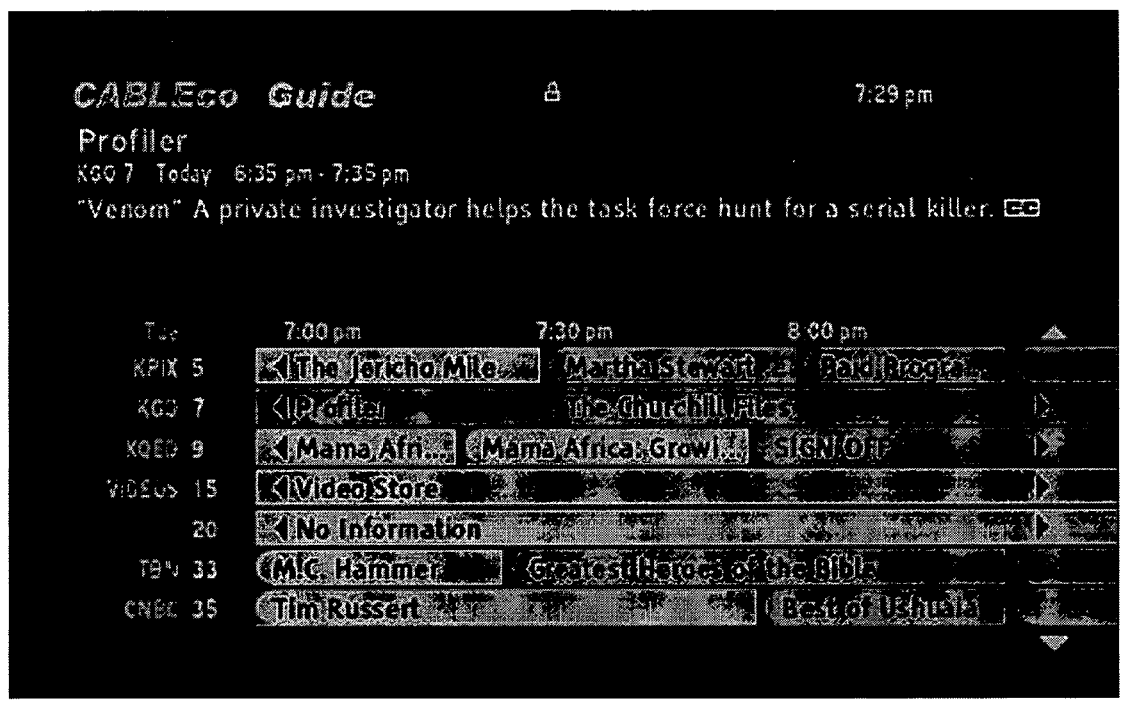
FIG. 12 depicts a target screen having a dimension of 576 pixels by 360 pixels in which limousine scaling has been used.

FIG. 12 depicts a screen 1200 having a dimension of 576 pixels by 360 pixels, where non-proportional limousine scaling has been used. The result is that the on-screen graphical data objects do not have distorted or misshapen appearances.

Figure 13:
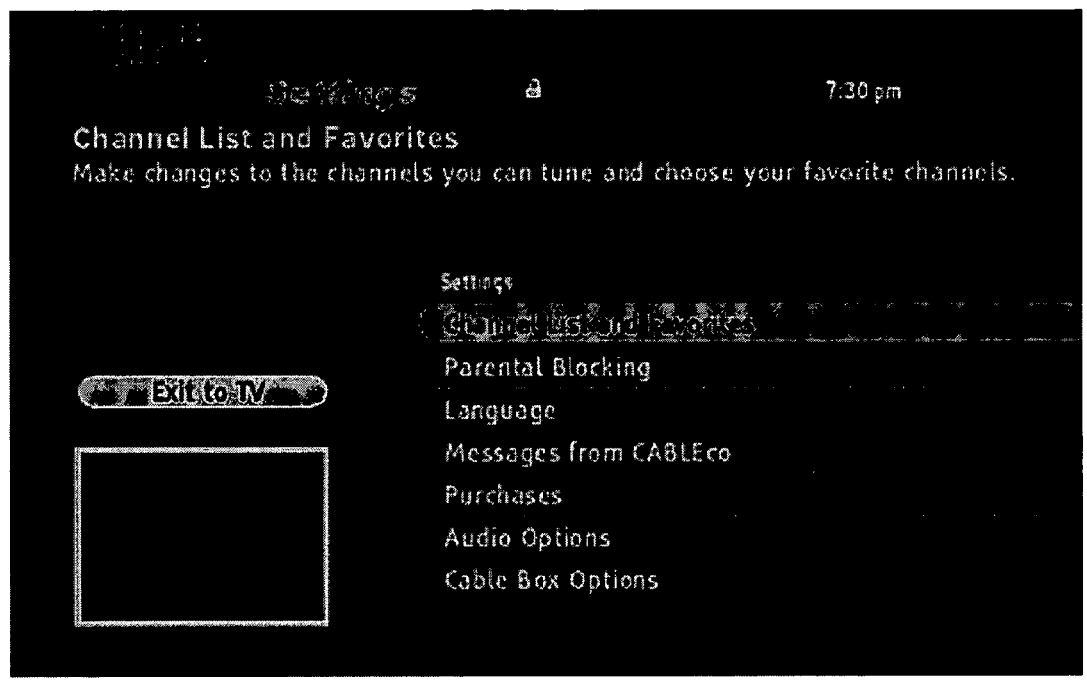
FIG. 13 depicts a target screen having a dimension of 576 pixels by 360 pixels where limousine scaling has been used such that most of the stretching of graphical elements on the original screen have been stretched toward the right side of the depicted target screen.

FIG. 13 depicts a screen 1300 having a dimension of 576, pixels by 360 pixels, where non-proportional limousine scaling has been used. Limousine scaling has stretched most of the graphical elements toward the right side of the target screen.

Exemplary Environment

Various environments are suitable and contemplated the disclosed embodiments in which a single set of user interface (UI) description data can be broadcast (such as via data carousels) to many clients with different screen resolutions and aspect ratios, and where each client can scale the UI to fit the screen because the limousine scaling uses integer arithmetic which is computationally inexpensive. Moreover, broadcast bandwidth usage is minimized by delivering only a single set of UI description data, rather than multiple sets (e.g., one for each different screen resolution). According, the environments for the various disclosed implementations are not limited to an exemplary implementation discussed below with respect to FIG. 14 regarding a TV network infrastructure.

Figure 14:
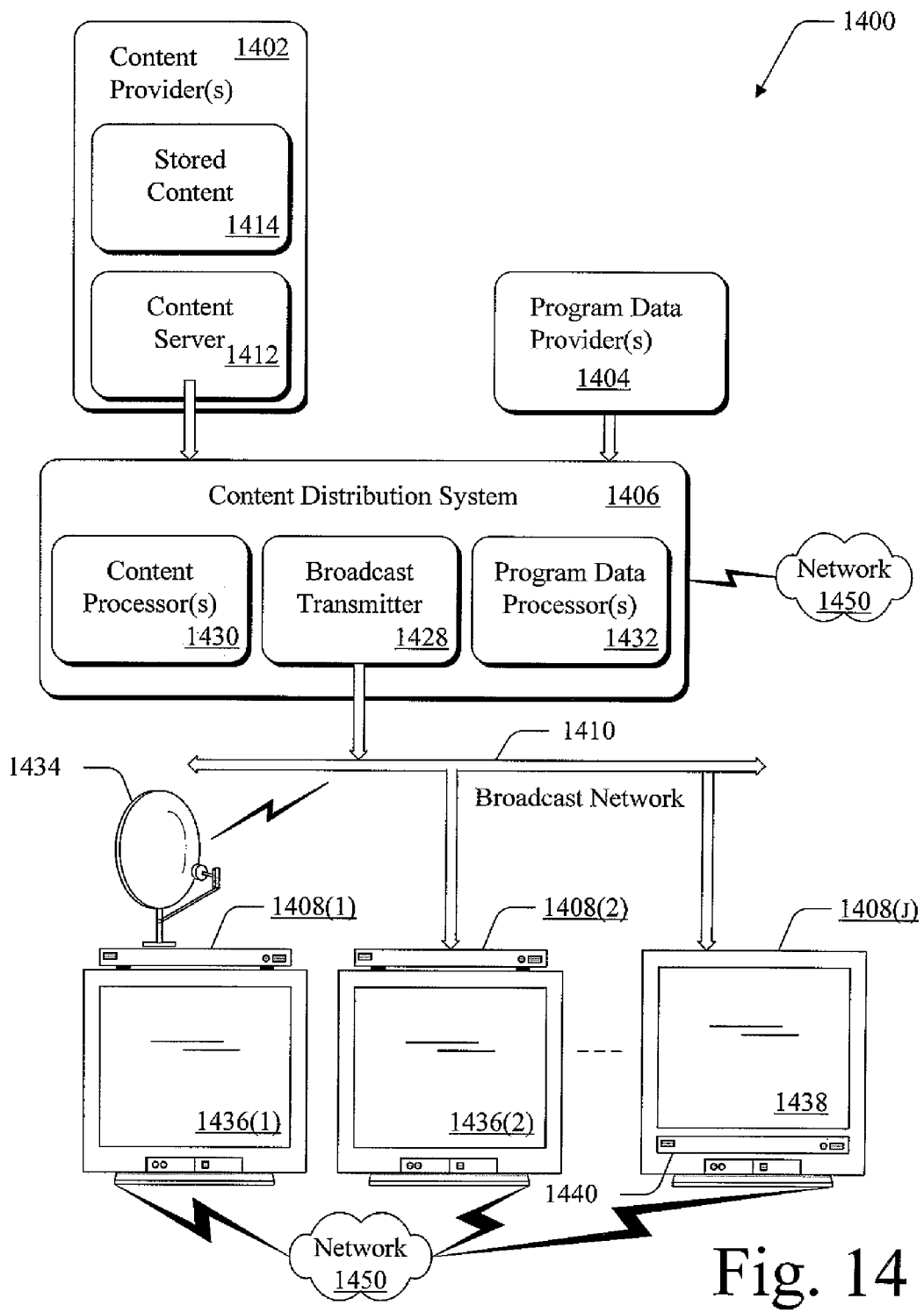
FIG. 14 illustrates an exemplary environment in which a viewer may receive content via a client that effects a transformation of an original screen having one resolution or aspect ratio into a target screen of a different resolution.

FIG. 14 illustrates an exemplary environment 1400 in which a viewer may receive content via a client that re-sizes the content to fit on a target screen as has been described above. Exemplary environment 1400 is a television entertainment system that facilitates distribution of content to multiple viewers. The environment 1400 includes one or more content providers 1402, one or more program data providers 1404, a content distribution system 1406, and multiple clients 1408(1), 1408(2), . . . , 1408(J) coupled to the content distribution system 1406 via a broadcast network 1410. Each client 1408 (1 through J) and the content distribution system 1406 are in communication with a network 1450 that provides two-way communications there between. The system may have two-way communications, but this is not required for the UI page scaling to work. The content distribution system 1406 services requests from the clients 1408(1)-1408(J). Each client 1408(J) can receive an original screen that has been designed for limousine stretching and can perform limousine stretching and integer rounding to output a display of a target screen, as has been described above.

Content provider 1402 includes a content server 1412 and stored content 1414, such as movies, television programs, commercials, music, and similar audio and/or video content. Content server 1412 controls distribution of the stored content 1414 from content provider 1402 to the content distribution system 1406. For example, the content server 1412 may broadcast the stored content 1414 to one or more of the clients 1408(1)-1408(J) in response to a request received from the clients 1408(1)-1408(J). Additionally, content server 1402 controls distribution of live content (e.g., content that was not previously stored, such as live feeds) and/or content stored at other locations to the content distribution system 1406.

Program data provider 1404 stores and provides an electronic program guide (EPG) database. Program data in the EPG includes program titles, ratings, characters, descriptions, actor names, station identifiers, channel identifiers, schedule information, and so on. The terms "program data" and "EPG data" are used interchangeably throughout this discussion, both of which may be thought of as forms of content that may be requested by one or more of the clients 1408(1)-1408(J).

The program data provider 1404 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The program data provider 1404 controls distribution of the published version of the program data to the content distribution system 1406 using, for example, a file transfer protocol (FTP) over a TCP/IP network (e.g., Internet, UNIX, etc.). Further, the published version of the program data can be transmitted from program data provider 1404 via a satellite 1434 directly to a client 1408 by use of a satellite dish 1434.

Content distribution system 1406 includes a broadcast transmitter 1428, one or more content processors 1430, and one or more program data processors 1432. Broadcast transmitter 1428 broadcasts signals, such as cable television signals, across broadcast network 1410. Broadcast network 1410 can include a cable television network, RF, microwave, satellite, and/or data network, such as the Internet, and may also include wired or wireless media using any broadcast format or broadcast protocol. Additionally, broadcast network 1410 can be any type of network, using any type of network topology and any network communication protocol, and can be represented or otherwise implemented as a combination of two or more networks. Although broadcast transmitter 1428 is illustrated as within the content distribution system 1406, the broadcast transmitter may also be included with the content server 1412.

Content processor 1430 processes the content received from content provider 1402 prior to transmitting the content across broadcast network 1410. Similarly, program data processor 1432 processes the program data received from program data provider 1404 prior to transmitting the program data across broadcast network 1410. A particular content processor 1430 may encode, or otherwise process, the received content into a format that is understood by the multiple clients 1408(1), 1408(2), ..., 1408(J) coupled to broadcast network 1410. Although FIG. 14 shows a single content provider 1402, a single program data provider 1404, and a single content distribution system 1406, exemplary environment 1400 can include any number of content providers and/or program data providers coupled to any number of content distribution systems.

Content distribution system 1406 is representative of a head end service with one or more carousels that provides content to multiple subscribers. For example, the content may include a result of processing that was performed in response to a request sent by one or more of the clients 1408(1)-1408(J). Each content distribution system 1404 may receive a slightly different version of the program data that takes into account different programming preferences and lineups. The program data provider 1404 creates different versions of EPG data (e.g., different versions of a program guide) that include those channels of relevance to respective head end services, and the content distribution system 1406 transmits the EPG data to the multiple clients 1408(1), 1408(2), ..., 1408(J). In one implementation, for example, content distribution system 1406 utilizes a carousel file system to repeatedly broadcast the EPG data over an out-of-band (OOB) channel to the clients 1408.

Clients 1408 can be implemented in a number of ways. For example, a client 1408(1) receives broadcast content from a satellite-based transmitter via satellite dish 1434. Client 1408(1) is also referred to as a set-top box or a satellite receiving device. Client 1408(1) is coupled to a television 1436(1) for presenting the content received by the client (e.g., audio data and video data), as well as a graphical user interface. A particular client 1408 can be coupled to any number of televisions 1436 and/or similar devices that can be implemented to display or otherwise render content. Similarly, any number of clients 1408 can be coupled to a single television 1436.

Client 1408(2) is also coupled to receive broadcast content from broadcast network 1410 and provide the received content to associated television 1436(2). Client 1408(J) is an example of a combination television 1438 and integrated set-top box 1440. In this example, the various components and functionality of the set-top box are incorporated into the television, rather than using two separate devices. The functionality of the set-top box within the television enables the receipt of different kinds of signals, such as via a satellite dish (similar to satellite dish 1434) and/or via broadcast network 1410. In alternate implementations, clients 1408 may receive signals via network 1450, such as the Internet, or any other broadcast medium.

Each client 1408 runs one or more applications. As mentioned above, one such application can enable client 1408(J) to receive an original screen that has been designed for limousine stretching and can enable limousine stretching and integer rounding operations so as to output a display of a target screen, as has been described above. Another application may enable a television viewer to navigate through an onscreen program guide, locate television shows of interest to the viewer, and purchase items, view linear programming as well as pay per view and/or video on demand programming. As such, one or more of the program data providers 1404 can include stored on-demand content, such as Video On Demand (VOD) movie content, and near VOD such as pay per view movie content. The stored on-demand and near on-demand content can be viewed with a client 1408. Each client 1408 receives content and adapts the content for output to a target screen that is displayed on the television 1436. This adaptation process undertaken by the client 1408 includes the limousine stretching and integer rounding techniques as disclosed in this patent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising identifying an original graphic data object having a left vertical edge, a right vertical edge, a top horizontal edge, and a bottom horizontal edge, rendered in association with an original screen having a horizontal axis and a vertical axis, wherein the original screen has a resizing point on the horizontal axis such that a line extending through the resizing point and parallel to the vertical axis intersects the original graphic data object;

identifying a target screen having a different aspect ratio than the original screen, wherein a target graphic data object corresponding to the original graphic data object is to be rendered in association with the target screen;

determining a height, $H_{OO}$, and a width, $W_{OO}$, of the original graphic data object, wherein:

$H_{OO}$ represents a distance between the top and bottom horizontal edges of the original graphic data object; and $W_{OO}$ represents a distance between the left and right vertical edges of the original graphic data object;

determining a height, $H_{OS}$, and a width, $W_{OS}$, of the original screen;

determining a height, $H_{TS}$, and a width, $W_{TS}$, of the target screen;

determining a distance, $D_{VO}$, between a particular one of the vertical edges of the original graphic data object and a vertical edge of the original screen, and a distance, $D_{HO}$, between a particular one of the horizontal edges of the original graphic data object and a horizontal edge of the original screen;

calculating a height ratio, $R_H$ such that:

$$R_H = (H_{TS}/H_{OS});$$

calculating a stretch distance, S, such that:

$$S = W_{TS} - (R_H * W_{OS});$$

calculating a height, $H_{TO}$, and a width, $W_{TO}$, of the target graphic data object, such that:

$$H_{TO} = H_{OO} * R_H; \text{ and}$$

$$W_{TO} = (W_{OO} * R_H) + S;$$

calculating a distance $D_{VT}$ between a vertical edge of the target graphic data object and a vertical edge of the target screen, wherein the vertical edge of the target graphic data object corresponds to the particular one of the vertical edges of the original graphic data object and the vertical edge of the target screen corresponds to the vertical edge of the original screen, such that:

$$D_{VT} = D_{VO} * R_H;$$

calculating a distance $D_{HT}$ between a horizontal edge of the target graphic data object and a horizontal edge of the target screen, wherein the horizontal edge of the target graphic data object corresponds to the particular one of the horizontal edges of the original graphic data object and the horizontal edge of the target screen corresponds to the horizontal edge of the original screen, such that:

$$D_{HT} = D_{HO} * R_H;$$

calculating display coordinates for the target graphic data object; and rendering the target graphic data object in association with the target screen at a location indicated by the display coordinates.

2. The method as defined in claim 1, further comprising outputting a display that includes the target graphic data object displayed at the display coordinates on the target screen.

3. The method as defined in claim 1, wherein calculating the display coordinates comprises:

calculating intermediate display coordinates based on the calculated $H_{TO}$, $W_{TO}$, $D_{VT}$, and $D_{HT}$; and calculating the display coordinates by rounding the intermediate display coordinates to an integer value, thereby potentially modifying the size of the target graphic data object.

4. A method comprising:

identifying a first original graphic data object having top, bottom, left, and right edges, rendered in association with a rectangular original screen having an x-axis, wherein the original screen has a resizing point on the x-axis such that a line extending through the resizing point and perpendicular to the x-axis intersects the first original graphic data object;

identifying a target screen having a different aspect ratio than the original screen, wherein a first target graphic data object corresponding to the first original graphic data object is to be rendered in association with the target screen;

determining a height, $H_{OS}$, and a width, $W_{OS}$, of the original screen;

determining a height, $H_{TS}$, and a width, $W_{TS}$, of the target screen;

calculating a height ratio, $R_H$, such that:

$$R_H = H_{TS}/H_{OS};$$

calculating a stretch distance, S, such that:

$$S = W_{TS} - (R_H * W_{OS});$$

determining a height, $H_{OO}(1)$, and a width, $W_{OO}(1)$, of the first original graphic data object, wherein:

$H_{OO}(1)$ represents a distance between the top and bottom edges of the first original graphic data object; and $W_{OO}(1)$ represents a distance between the left and right edges of the first original graphic data object;

determining a distance, $O_{TD}(1)$, between the top edge of the first original graphic data object and a top edge of the original screen, and a distance, $O_{LD}(1)$, between the left edge of the first original graphic data object and a left edge of the original screen;

calculating a height, $H_{TO}(1)$, and a width, $W_{TO}(1)$, of the first target graphic data object, such that:

$$H_{TO}(1) = R_H * H_{OO}(1); \text{ and}$$

$$W_{TO}(1) = (R_H * W_{OO}(1)) + S;$$

calculating a distance, $T_{TD}(1)$ between a top edge of the first target graphic data object and a top edge of the target screen, and a distance, $T_{LD}(1)$ between a left edge of the first target graphic data object and a left edge of the target screen, such that:

$$T_{TD}(1) = O_{TD}(1) * R_H; \text{ and}$$

$$T_{LD}(1) = O_{LD}(1) * R_H;$$

identifying a second original graphic data object having top, bottom, left, and right edges, rendered in association with the original screen, wherein the right edge of the second original graphic data object is to the left of the line extending through the resizing point, and wherein a second target graphic data object corresponding to the second original graphic data object is to be rendered in association with the target screen;

determining a height, $H_{OO}(2)$, and a width, $W_{OO}(2)$, of the second original graphic data object, wherein:

$H_{OO}(2)$ represents a distance between the top and bottom edges of the second original graphic data object; and $W_{OO}(2)$ represents a distance between the left and right edges of the second original graphic data object;

determining a distance, $O_{TD}(2)$, between the top edge of the second original graphic data object and the top edge of the original screen, and a distance, $O_{LD}(2)$, between the left edge of the second original graphic data object and the left edge of the original screen;

calculating a height, $H_{TO}(2)$, and a width, $W_{TO}(2)$, of the second target graphic data object, such that:

$$H_{TO}(2)=R_H*H_{OO}(2); \text{ and}$$

$$W_{TO}(2)=R_H*W_{OO}(2);$$

calculating a distance, $T_{TD}(2)$, between a top edge of the second target graphic data object and the top edge of the target screen, and a distance, $T_{LD}(2)$, between a left edge of the second target graphic data object and the left edge of the target screen, such that:

$$T_{TD}(2)=O_{TD}(2)*R_H; \text{ and}$$

$$T_{LD}(2)=O_{LD}(2)*R_H; \text{ and}$$

rendering the first and second target graphic data objects in association with the target screen according to the calculated $H_{TO}(1)$, $W_{TO}(1)$, $T_{TD}(1)$, $T_{LD}(1)$, $H_{TO}(2)$, $W_{TO}(2)$, $T_{TD}(2)$, and $T_{LD}(2)$.

5. The method as defined in claim 4, further comprising:
identifying a third original graphic data object having left, right, top, and bottom edges, rendered in association with the original screen, wherein the left edge of the third original graphic data object is to the right of the line extending through the resizing point, and wherein a third target graphic data object corresponding to the third original graphic data object is to be rendered in association with the target screen;

determining a height, $H_{OO}(3)$, and a width, $W_{OO}(3)$, of the third original graphic data object, wherein:

$H_{OO}(3)$ represents a distance between the top and bottom edges of the third original graphic data object; and $W_{OO}(3)$ represents a distance between the left and right edges of the third original graphic data object;

determining a distance, $O_{TD}(3)$, between the top edge of the third original data object and the top edge of the original screen, and a distance, $O_{RD}(3)$, between the right edge of the third original data object and a right edge of the original screen;

calculating a height, $H_{TO}(3)$, and a width, $W_{TO}(3)$, of the third target graphic data object such that:

$$H_{TO}(3)=H_{OO}(3)*R_H; \text{ and}$$

$$W_{TO}(3)=W_{OO}(3)*R_H;$$

calculating a distance, $T_{TD}(3)$, between a top edge of the third target graphic data object and the top edge of the target screen, and a distance, $T_{RD}(3)$, between a right edge of the third target graphic data object and a right edge of the target screen such that:

$$T_{TD}(3)=O_{TD}(3)*R_H; \text{ and}$$

$$T_{RD}(3)=O_{RD}(3)*R_H; \text{ and}$$

rendering the third target graphic data object in association with the target screen according to the calculated $H_{TO}(3)$, $W_{TO}(3)$, $T_{TD}(3)$, and $T_{LD}(3)$.

6. The method as defined in claim 4, wherein the stretch distance, S, is included in the calculation of the width of the first target graphic data object based on a determination that the line extending through the resizing point intersects the first original graphic data object.

7. A method according to claim 4, further comprising:
obtaining graphic characteristics for the first original graphic data object; and
applying the graphic characteristics for the first original graphic data object to the first target graphic data object.

8. A method according to claim 7, wherein the graphic characteristics comprise a fill pattern.

9. A method according to claim 7, wherein the graphic characteristics comprise a color designation.

10. A method according to claim 7, wherein the graphic characteristics comprise a border style of the first original graphic data object.

11. A method according to claim 4, further comprising:
identifying text attached to the first original graphic data object;
attaching to the first target graphic data object, text corresponding to the text attached to the first original graphic data object.

12. A method according to claim 11, wherein attaching to the first target graphic data object, the text corresponding to the text attached to the first original graphic data object further comprises maintaining the text being attached to the first target graphic data object within opposing top and bottom edges and opposing left and right edges of the first target graphic data object.

13. The method as defined in claim 4, further comprising:
calculating intermediate display coordinates based on the calculated $H_{TO}(1)$, $W_{TO}(1)$, $T_{TD}(1)$, and $T_{LD}(1)$; and
calculating target display coordinates for the first target graphic data object by rounding the intermediate display coordinates to an integer value, thereby potentially modifying the size of the first target graphic data object.

14. The method as defined in claim 4, further comprising outputting a display that includes the first and second target graphic data objects displayed on the target screen.

15. A method comprising:
identifying an original graphic data object having a left vertical edge, a right vertical edge, a top horizontal edge, and a bottom horizontal edge, rendered in association with an original screen having a horizontal axis and a vertical axis, wherein the original screen has a resizing point on the vertical axis such that a line extending through the resizing point and perpendicular to the vertical intersects the original graphic data object;

identifying a target screen having a different aspect ratio than the original screen, wherein a target graphic data object corresponding to the original graphic data object is to be rendered in association with the target screen;

determining a height, $H_{OO}$, and a width, $W_{OO}$, of the original graphic data object, wherein:

$H_{OO}$ represents a distance between the top and bottom horizontal edges of the original graphic data object; and $W_{OO}$ represents a distance between the left and right vertical edges of the original graphic data object;

determining a height, $H_{OS}$, and a width, $W_{OS}$, of the original screen;

determining a height, $H_{TS}$, and a width, $W_{TS}$, of the target screen;

determining a distance, $D_{VO}$, between a particular one of the vertical edges of the original graphic data object and a vertical edge of the original screen, and a distance, $D_{HO}$, between a particular one of the horizontal edges of the original graphic data object and a horizontal edge of the original screen;

calculating a width ratio, $R_W$ such that:

$$R_W=(WT_S/W_{OS});$$

calculating a stretch distance, S, such that:

$$S = H_{TS} - (R_W * H_{OS});$$

calculating a height, $H_{TO}$, and a width, $W_{TO}$, of the target graphic data object, such that:

$$W_{TO} = W_{OO} * R_W;\text{ and}$$

$$H_{TO} = (H_{OO} * R_W) + S;$$

calculating a distance $D_{VT}$ between a vertical edge of the target graphic data object and a vertical edge of the target screen, wherein the vertical edge of the target graphic data object corresponds to the particular one of the vertical edges of the original graphic data object and the vertical edge of the target screen corresponds to the vertical edge of the original screen, such that:

$$D_{VT} = D_{VO} * R_W;$$

calculating a distance $D_{HT}$ between a horizontal edge of the target graphic data object and a horizontal edge of the target screen, wherein the horizontal edge of the target graphic data object corresponds to the particular one of the horizontal edges of the original graphic data object and the horizontal edge of the target screen corresponds to the horizontal edge of the original screen, such that:

$$D_{HT} = D_{HO} * R_W;$$

calculating display coordinates for the target graphic data object; and rendering the target graphic data object in association with the target screen at a location indicated by the display coordinates.

16. A method comprising:

identifying a first original graphic data object having left, right, top, and bottom edges, rendered in association with a rectangular original screen having a y-axis, wherein the original screen has a resizing point on the y-axis such that a line extending through the resizing point and perpendicular to the y-axis intersects the first original graphic data object;

identifying a target screen having a different aspect ratio than the original screen, wherein a first target graphic data object corresponding to the first original graphic data object is to be rendered in association with the target screen;

determining a height, $H_{OS}$, and a width, $W_{OS}$, of the original screen;

determining a height, $H_{TS}$, and a width, $W_{TS}$, of the target screen;

calculating a width ratio, $R_W$, such that:

$$R_W = W_{TS} / W_{OS};$$

calculating a stretch distance, S, such that:

$$S = H_{TS} - (R_W * H_{OS});$$

determining a height, $H_{OO}(1)$, and a width, $W_{OO}(1)$, of the first original graphic data object, wherein:

$H_{OO}(1)$ represents a distance between the top and bottom edges of the first original graphic data object; and $W_{OO}(1)$ represents a distance between the left and right edges of the first original graphic data object;

determining a distance, $O_{TD}(1)$ between the top edge of the first original graphic data object and a top edge of the original screen, and a distance, $O_{LD}(1)$ between the left edge of the first original graphic data object and a left edge of the original screen;

calculating a height, $H_{TO}(1)$, and a width, $W_{TO}(1)$, of the first target graphic data object such that:

$$H_{TO}(1) = (R_W * H_{OO}(1)) + S;\text{ and}$$

$$W_{TO}(1) = R_W * W_{OO}(1);$$

calculating a distance, $T_{TD}(1)$, between a top edge of the first target graphic data object and a top edge of the target screen and a distance, $T_{LD}(1)$, between a left edge of the first target graphic data object and a left edge of the target screen such that such that:

$$T_{TD}(1) = O_{TD}(1) * R_W;\text{ and}$$

$$T_{LD}(1) = O_{LD}(1) * R_W;$$

identifying a second original graphic data object having left, right, top, and bottom edges, rendered in association with the original screen, wherein the bottom edge of the second original graphic data object is above the line extending through the resizing point, and wherein a second target graphic data object corresponding to the second original graphic data object is to be rendered in association with the target screen;

determining a height, $H_{OO}(2)$, and a width, $W_{OO}(2)$, of the second original graphic data objects, wherein:

$H_{OO}(2)$ represents a distance between the top and bottom edges of the second original graphic data object; and $W_{OO}(2)$ represents a distance between the left and right edges of the second original graphic data object;

determining a distance, $O_{TD}(2)$, between the top edge of the second original graphic data object and the top edge of the original screen and a distance, $O_{LD}(2)$, between the left edge of the second original graphic data object and the left edge of the original screen;

calculating a height, $H_{TO}(2)$, and a width, $W_{TO}(2)$, of the second target graphic data object such that:

$$H_{TO}(2) = R_W * H_{OO}(2);\text{ and}$$

$$W_{TO}(2) = R_W * W_{OO}(2);$$

calculating a distance, $T_{TD}(2)$, between a top edge of the second target graphic data object and the top edge of the target screen and a distance, $T_{LD}(2)$, between a left edge of the second target graphic data object and the left edge of the target screen such that:

$$T_{TD}(2) = O_{TD}(2) * R_W;\text{ and}$$

$$T_{LD}(2) = O_{LD}(2) * R_W;\text{ and}$$

rendering the first and second target graphic data objects in association with the target screen according to the calculated $H_{TO}(1)$, $W_{TO}(1)$, $T_{TD}(1)$, $T_{LD}(1)$, $H_{TO}(2)$, $W_{TO}(2)$, $T_{TD}(2)$, and $T_{LD}(2)$.

17. The method as defined in claim 16, further comprising:

identifying a third original graphic data object having left, right, top, and bottom edges, rendered in association with the original screen, wherein the top edge of the third original graphic data object is below the line extending through the resizing point, and wherein a third target graphic data object corresponding to the third original graphic data object is to be rendered in association with the target screen;

determining a height, $H_{OO}(3)$, and a width, $W_{OO}(3)$, of the third original graphic data object, wherein:

$H_{OO}(3)$ represents a distance between the top and bottom edges of the third original graphic data object; and $W_{OO}(3)$ represents a distance between the left and right edges of the third original graphic data object;

determining a distance, $O_{BD}(3)$, between the bottom edge of the third original graphic data object and a bottom edge of the original screen and a distance $O_{LD}(3)$ between the left edge of the third original graphic data object and the left edge of the original screen;

calculating a height, $H_{TO}(3)$, and a width, $W_{TO}(3)$, of the third target graphic data object such that:

$$H_{TO}(3)=H_{OO}(3)*R_W; \text{ and}$$

$$W_{TO}(3)=W_{OO}(3)*R_W;$$

calculating a distance, $T_{BD}(3)$, between a bottom edge of the third target graphic data object and a bottom edge of the target screen, and a distance, $T_{LD}(3)$, between a left edge of the third target graphic data object and the left edge of the target screen such that:

$$T_{BD}(3)=O_{BD}(3)*R_W; \text{ and}$$

$$T_{LD}(3)=O_{LD}(3)*R_W; \text{ and}$$

rendering the third target graphic data object in association with the target screen according to the calculated $H_{TO}(3)$, $W_{TO}(3)$, $T_{BD}(3)$, $T_{LD}(3)$.

18. The method as defined in claim 16, wherein the stretch distance, S, is included in the calculation of the height of the first target graphic data object based on a determination that the line extending through the resizing point intersects the first original graphic data object.

19. A method according to claim 16, further comprising:
obtaining graphic characteristics for the first original graphic data object; and
applying the graphic characteristics for the first original graphic data object to the first target graphic data object.

20. A method according to claim 19, wherein the graphic characteristics comprise a fill pattern.

21. A method according to claim 19, wherein the graphic characteristics comprise a color designation.

22. A method according to claim 19, wherein the graphic characteristics comprise a border style of the first original graphic data object.

23. A method according to claim 16, further comprising:
identifying text attached to the first original graphic data object;
attaching to the first target graphic data object, text corresponding to the text attached to the first original graphic data object.

24. A method according to claim 23, wherein attaching to the first target graphic data object, the text corresponding to the text attached to the first original graphic data object, further comprises maintaining the text being attached to the first target graphic data object within opposing top and bottom edges and within opposing left and right edges of the first target graphic data object.

25. The method as defined in claim 16, further comprising:
calculating intermediate display coordinates based on the calculated $H_{TO}(1)$, $W_{TO}(1)$, $T_{TD}(1)$, and $T_{LD}(1)$; and
calculating target display coordinates for the first target graphic data object by rounding the intermediate display coordinates to an integer value, thereby potentially modifying the size of the first target graphic data object.

26. A computer readable media comprising computer-readable instructions which, when executed by a computing system, direct the computing system to transform an original screen to a target screen by:

identifying the original screen and the target screen, wherein the original and target screens each have opposing top and bottom edges with a respective height there between and opposing left and right edges with a respective width there between;

identifying an original graphic data object on the original screen, wherein the original graphic data object has opposing top and bottom edges with a respective height there between and opposing left and right edges with a respective width there between;

identifying a height, $H_{OS}$, and a width, $W_{OS}$, of the original screen;

identifying a height, $H_{TS}$, and a width, $W_{TS}$, the target screen;

identifying a height, $H_{OO}$, and a width, $W_{OO}$, of the original graphic data object;

identifying a distance, $O_{OV}$, between a vertical edge of the original graphic data object and a vertical edge of the original screen, and a distance, $O_{HD}$, between a horizontal edge of the original graphic data object and a horizontal edge of the original screen;

defining a target graphic data object that corresponds to the original graphic data object, wherein the target graphic data object is to be rendered on the target screen;

in an event that $(W_{TS}/W_{OS})>(H_{TS}/H_{OS})$:
identifying a resizing point along a horizontal axis of the original screen;
determining that a line through the resizing point and perpendicular to the horizontal axis intersects the original graphic data object;
calculating a height ratio, $R_H$, such that;

$$R_H=H_{TS}/H_{OS};$$

calculating a stretch distance, S, such that:

$$S=W_{TS}-(W_{OS}*R_H);$$

calculating a height, $H_{TO}$, and a width, $W_{TO}$, of the target graphic data object such that:

$$H_{TO}=H_{OO}*R_H; \text{ and}$$

$$W_{TO}=(W_{OO}*R_H)+S; \text{ and}$$

calculating a distance, $T_{VD}$, between a vertical edge of the target graphic data object and a vertical edge of the target screen, and a distance, $T_{HD}$, between a horizontal edge of the target graphic data object and a horizontal edge of the target screen, wherein the vertical and horizontal edges of the target graphic data object correspond, respectively, to the vertical and horizontal edges of the original graphic data object and wherein the vertical and horizontal edges of the target screen correspond, respectively, to the vertical and horizontal edges of the original screen, such that:

$$T_{VD}=O_{VD}*R_H; \text{ and}$$

$$T_{HD}=O_{HD}*R_H;$$

in an event that $(H_{TS}/H_{OS})>(W_{TS}/W_{OS})$:
identifying a resizing point along a vertical axis of the original screen;
determining that a line through the resizing point and perpendicular to the vertical axis intersects the original graphic data object;
calculating a width ratio, $R_W$, such that:

$$R_W=W_{TS}/W_{OS};$$

calculating a stretch distance, S, such that:

$$S=H_{TS}-(H_{OS}*R_W);$$

calculating a height, $H_{TO}$, and a width, $W_{TO}$, of the target graphic data object such that:

$$H_{TO}=(H_{OO}*R_W)+S;\text{ and}$$

$$W_{TO}=W_{OO}*R_W;$$

calculating a distance, $T_{VD}$, between a vertical edge of the target graphic data object and a vertical edge of the target screen, and a distance, $T_{HD}$, between a horizontal edge of the target graphic data object and a horizontal edge of the target screen, wherein the vertical and horizontal edges of the target graphic data object correspond, respectively, to the vertical and horizontal edges of the original graphic data object and wherein the vertical and horizontal edges of the target screen correspond, respectively, to the vertical and horizontal edges of the original screen, such that:

$$T_{VD}=O_{VD}*R_W;\text{ and}$$

$$T_{HD}=O_{HD}*R_W;\text{ and}$$

rendering the target data object in association with the target screen according to the calculated $H_{TO}$, $W_{TO}$, $T_{VD}$, and $T_{HD}$.

27. The computer readable media according to claim 26, further comprising:
obtaining graphic characteristics for and text attached to the original graphic data object;
attaching to the target graphic data object, text that corresponds to the text attached to the original graphic data object; and
applying the graphic characteristics to the target graphic data object.

28. The computer readable media according to claim 27, wherein attaching to the target graphic data object, the text that corresponds to the text attached to the original graphic data object comprises maintaining the text within opposing top and bottom edges and within opposing left and right edges of the target graphic data object.

29. The computer readable media according to claim 27, wherein the graphic characteristics comprise a fill pattern.

30. The computer readable media according to claim 27, wherein the graphic characteristics comprise a color designation.

31. The computer readable media according to claim 27, wherein the graphic characteristics comprise a border style of the original graphic data object.

32. The computer readable media as defined in claim 26, further comprising:
calculating intermediate display coordinates based on the calculated $H_{TO}$, $W_{TO}$, $T_{VD}$, and $T_{HD}$; and
calculating target display coordinates for the first target graphic data object by rounding the intermediate display coordinates to an integer value, thereby potentially modifying the size of the target graphic data object; and
outputting a display that includes the target graphic data object displayed at the display coordinates on the target screen.

33. A computer readable media comprising computer-readable instructions which, when executed by a computer, performs steps that include:
determining that:
an original screen is to be transformed into a target screen of a different aspect ratio, wherein the original and target screens each have opposing top and bottom edges with a respective height there between and opposing left and right edges with a respective width there between, and wherein $H_{OS}$ represents the height of the original screen, $H_{TS}$ represents the height of the target screen, $W_{OS}$ represents the width of the original screen, and $W_{TS}$ represents the width of the target screen;
a resizing point is defined on the original screen, wherein the resizing point is represented by a coordinate pair $(X_R, Y_R)$ wherein $X_R$ represents a distance from the left edge of the original screen to the resizing point, and wherein $Y_R$ represents a distance from the top edge of the original screen to the resizing point; and
a resizing line perpendicular to one of the edges of the original screen intersects:
the resizing point; and
one or more original points on at least one edge of an original graphic data object having a plurality of original points, each of the plurality of original points having a respective distance from the opposing top and bottom edges of the original screen and from the opposing left and right edges of the original screen, wherein, a coordinate pair $(X_O, Y_O)$ is defined for each of the original points such that for each point, $X_O$ represents a distance from the left edge of the original screen to the point, and $Y_O$ represents a distance from the top edge of the original screen to the point, and wherein, based on the intersection of the resizing line with the one or more original points, the original graphic data object is designated as being disproportionately resizable;
in an event that $(W_{TS}/W_{OS})>(H_{TS}/H_{OS})$ and the resizing point is along a horizontal axis of the original screen:
calculating a stretch distance, S, such that:

$$S=W_{TS}-((H_{TS}/H_{OS})*W_{OS});$$

for each of the plurality of original points for which $(X_O<X_R)$, calculating a target point represented by a coordinate pair $(X_T, Y_T)$ wherein $X_T$ represents a distance from the left edge of the target screen to the target point, and $Y_T$ represents a distance from the top edge of the target screen to the target point, and wherein:

$$X_T=X_O*(H_{TS}/H_{OS});\text{ and}$$

$$Y_T=Y_O*(H_{TS}/H_{OS});$$

for each of the plurality of original points for which $(X_O>X_R)$, calculating a target point represented by a coordinate pair $(X_T, Y_T)$, wherein $X_T$ represents a distance from the left edge of the target screen to the target point and $Y_T$ represents a distance from the top edge of the target screen to the target point, and wherein:

$$X_T=(X_O*(H_{TS}/H_{OS}))+S;\text{ and}$$

$$Y_T=Y_O*(H_{TS}/H_{OS});\text{ and}$$

for each of the plurality of original points for which $(X_O>X_R)$, calculating a target line segment between a first point $(X_{T1}, Y_{T1})$ and a second point $(X_{T2}, Y_{T2})$, wherein $X_{T1}$ represents a distance from the left edge of the target screen to the first point, $Y_{T1}$ represents a distance from the top edge of the target screen to the first point, $X_{T2}$ represents a distance from the left edge of the target screen to the second point, and $Y_{T2}$ rep resents a distance from the top edge of the target screen to the second point, and wherein:

$X_{T1} = X_O * (H_{TS}/H_{OS})$;

$Y_{T1} = Y_O * (H_{TS}/H_{OS})$;

$X_{T2} = (X_O * (H_{TS}/H_{OS})) + S$; and $Y_{T2} = Y_O * (H_{TS}/H_{OS})$;

in an event that $(W_{TS}/W_{OS}) < (H_{TS}/H_{OS})$ and the resizing point is along a vertical axis of the original screen: calculating a stretch distance, S, such that:

$S = H_{TS} - ((W_{TS}/W_{OS}) * H_{OS})$;

for each of the plurality of original points for which $(Y_O < Y_R)$, calculating a target point represented by a coordinate pair $(X_T, Y_T)$, wherein $X_T$ represents a distance from the left edge of the target screen to the target point and $Y_T$ represents a distance from the top edge of the target screen to the target point, and wherein:

$X_T = X_O * (W_{TS}/W_{OS})$; and $Y_T = Y_O * (W_{TS}/W_{OS})$;

for each of the plurality of original points for which $(Y_O > Y_R)$, calculating a target point represented by a coordinate pair $(X_T, Y_T)$, wherein $X_T$ represents a distance from the left edge of the target screen to the target point and $Y_T$ represents a distance from the top edge of the target screen to the target point, and wherein:

$X_t = X_O * (W_{TS}/W_{OS})$; and $Y_T = (Y_O * (W_{TS}/W_{OS})) + S$; and for each of the plurality of original points for which $(Y_O = Y_R)$, calculating a target line segment between a first point $(X_{T1}, Y_{T1})$ and a second point $(X_{T2}, Y_{T2})$, wherein $X_{T1}$ represents a distance from the left edge of the target screen to the first point, $Y_{T1}$ represents a distance from the top edge of the target screen to the first point, $X_{T2}$ represents a distance from the left edge of the target screen to the second point, and $Y_{T2}$ represents a distance from the top edge of the target screen to the second point, and wherein:

$X_{T1} = X_O * (W_{TS}/W_{OS})$;

$Y_{T1} = Y_O * (W_{TS}/W_{OS})$;

$X_{T2} = X_O * (W_{TS}/W_{OS})$; and $Y_{T2} = (Y_O * (W_{TS}/W_{OS})) + S$; and forming a target graphic data object on the target screen from the target points and the target line segments.

34. The computer readable media according to claim 33, wherein forming the target graphic data object further comprises:
obtaining graphic characteristics for and text attached to the original graphic data object;
attaching to the target graphic data object, text corresponding to the text attached to the original graphic data object; and
applying the graphic characteristics to the target graphic data object.

35. The computer readable media according to claim 34, wherein attaching to the target graphic data object, the text that corresponds to the text attached to the original graphic data object comprises maintaining the text within opposing top and bottom edges and the opposing left and right edges of the target graphic data object.

36. The computer readable media according to claim 34, wherein the graphic characteristics comprise a fill pattern.

37. The computer readable media according to claim 34, wherein the graphic characteristics comprise a color designation.

38. The computer readable media according to claim 34, wherein the graphic characteristics comprise a border style of the original graphic data object.

39. The computer readable media as defined in claim 33, wherein forming the target graphic data object further comprises:
for each target point $(W_T, Y_T)$, calculating an intermediate display point; and
for each intermediate display point, calculating a display point by rounding to an integer value, coordinates of the intermediate display point, thereby potentially modifying the size of the target graphic data object; and
outputting, on the target screen, a display that includes the target graphic data object as defined by the display coordinates.

40. A computer graphics system for obtaining first and second target graphic data objects on a rectangular target screen based on first and second original graphic data objects on a rectangular original screen, the target screen having a different aspect ratio than that of the original screen, the computer graphics system comprising:
means for identifying a line perpendicular to an edge of the original screen, wherein the line projects from a resizing point on the edge;
means for determining that the first original graphic data object is proportionally resizable because the line does not intersect the first original graphic data object;
means for determining that the second original graphic data object is non-proportionally resizable because the line intersects the second original graphic data object;
means for determining a height, $H_{OS}$, and a width, $W_{OS}$, of the original screen;
means for determining a height $H_{TS}$, and a width, $W_{TS}$, of the target screen;
means for determining a resizing ratio, R, and a stretch distance, S, such that:

if $(H_{TS}/H_{OS}) > (W_{TS}/W_{OS})$;

$R = W_{TS}/W_{OS}$; and $S = H_{TS} - (R * H_{OS})$; and if $(H_{TS}/H_{OS}) < (W_{TS}/W_{OS})$:

$R = H_{TS}/H_{OS}$; and $S = W_{TS} - (R * W_{OS})$;

means for proportionally resizing the first original graphic data object to obtain a first target graphic data object, by calculating a height, $H_{TO}(1)$, and a width, $W_{TO}(1)$, of the first target graphic data object such that:

$H_{TO}(1) = H_{OO}(1) * R$; and $W_{TO}(1) = W_{OO}(1) * R$;

wherein $H_{OO}(1)$ represents a height of the first original graphic data object as measured between a top horizontal edge and a bottom horizontal edge of the first original graphic data object, and $W_{OO}(1)$ represents a width of the first original graphical data object, as measured between a left vertical edge and a right vertical edge of the first original graphic data object;

means for proportionally resizing the second original graphic data object to obtain a proportional graphic data object, by calculating a height, $H_{PO}$, and a width, $W_{PO}$, of the proportional graphic data object such that:

$$H_{PO}=H_{OO}(2)*R; \text{ and}$$

$$W_{PO}=W_{OO}(2)*R;$$

wherein $H_{OO}(2)$ represents a height of the second original graphic data object as measured between a top horizontal edge of the second original graphic data object and a bottom horizontal edge of the second original graphic data object, and $W_{OO}(2)$ represents a width of the second original graphic data object as measured between a left vertical edge of the second original graphic data object and a right vertical edge of the second original graphic data object; and means for non-proportionally resizing the proportional graphic data object by, calculating a height, $H_{TO}(2)$, and a width $W_{TO}(2)$, of the second target graphic data object, such that:

if $(H_{TS}/H_{OS}) > (W_{TS}/W_{OS})$;

$$H_{TO}(2)=H_{PO}+S; \text{ and}$$

$$W_{TO}(2)=W_{PO}; \text{ and}$$

if $(H_{TS}/H_{OS}) < (W_{TS}/W_{OS})$:

$$H_{TO}(2)=H_{PO}; \text{ and}$$

$$W_{TO}(2)=W_{PO}+S.$$

41. The computer graphics system as defined in claim 40, further comprising:
- means for obtaining graphic characteristics for and text associated with the first original graphic data object;
- means for repositioning the text to correspond to the first target graphic data object;
- means for applying the graphic characteristic to the first target graphic data object; and
- means for displaying the first target graphic data object on the target screen.

42. The computer graphics system as defined in claim 41, wherein the means for repositioning comprises means for positioning the text within opposing top and bottom edges and opposing left and right edges of the first target graphic data object.

43. The computer graphics system as defined in claim 40, further comprising means for calculating display coordinates associated with the first and second target graphic data objects by:
- calculating initial coordinates of the first and second target graphic data objects based on a distance $D_{VT}(1)$ between the first target graphic data object and a vertical edge of the target screen, a distance $D_{HT}(1)$ between the first target graphic data object and a horizontal edge of the target screen, a distance $D_{VT}(2)$ between the second target graphic data object and a vertical edge of the target screen, a distance $D_{HT}(2)$ between the second target graphic data object and a horizontal edge of the target screen, such that:

$$D_{VT}(1)=D_{VO}(1)*R;$$

$$D_{HT}(1)=D_{HO}(1)*R;$$

$$D_{VT}(2)=D_{VO}(2)*R; \text{ and}$$

$$D_{HT}(2)=D_{HO}(2)*R;$$

- rounding to an integer value, the initial coordinates of the first and second target graphic data objects, thereby potentially modifying the respective sizes of the first or second target graphic data objects.

44. The computer graphics system as defined in claim 40, further comprising:
- means for obtaining graphic characteristics for and text associated with the second original graphic data object;
- means for repositioning the text to correspond to the second target graphic data object;
- means for applying the graphic characteristics to the second target graphic data object; and
- means for displaying the second target graphic data object on the target screen.

45. The computer graphics system as defined in claim 44, wherein the means for repositioning comprises means for positioning the text within opposing top and bottom edges and opposing left and right edges of the second target graphic data object.

* * * * *